United States Patent
Ishiguro

(10) Patent No.: US 7,170,635 B2
(45) Date of Patent: Jan. 30, 2007

(54) IMAGE PROCESSING APPARATUS, IMAGE PROCESSING METHOD, AND COMPUTER PROGRAM PRODUCT THEREFOR

(75) Inventor: Kazuhiro Ishiguro, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 1023 days.

(21) Appl. No.: 10/153,496

(22) Filed: May 24, 2002

(65) Prior Publication Data
US 2003/0048958 A1 Mar. 13, 2003

(30) Foreign Application Priority Data
May 29, 2001 (JP) ............................. 2001-160741

(51) Int. Cl.
H04N 1/407 (2006.01)
G06K 15/00 (2006.01)
(52) U.S. Cl. ...................................... 358/1.9; 358/3.27
(58) Field of Classification Search ................ 358/1.9, 358/2.1, 3.24, 3.27; 382/260–269, 299
See application file for complete search history.

(56) References Cited

U.S. PATENT DOCUMENTS

| | | | |
|---|---|---|---|
| 6,122,441 A | 9/2000 | Tsuji | |
| 6,148,115 A * | 11/2000 | Mackinnon et al. | 382/266 |
| 6,914,628 B1 * | 7/2005 | Kuwata et al. | 348/272 |
| 6,965,416 B2 * | 11/2005 | Tsuchiya et al. | 348/606 |
| 7,016,549 B1 * | 3/2006 | Utagawa | 382/261 |
| 7,034,788 B2 * | 4/2006 | Someya et al. | 345/89 |

FOREIGN PATENT DOCUMENTS

| | | |
|---|---|---|
| JP | 9-238257 | 9/1997 |
| JP | 10-271336 | 10/1998 |
| JP | 11-346315 | 12/1999 |
| JP | 2000-59616 | 2/2000 |
| JP | 2001-78036 | 3/2001 |

* cited by examiner

Primary Examiner—Thomas D. Lee
Assistant Examiner—Stephen Brinich
(74) Attorney, Agent, or Firm—Buchanan Ingersoll & Rooney PC

(57) ABSTRACT

In an image processing method, a tone of a target pixel and tones of peripheral pixels around the target pixel are detected. Also, a tone difference between the target pixel and each peripheral pixel is detected. Then, smoothing processing is executed upon image data of the target pixel, based on the tone differences between the target pixel and the peripheral pixels, in such a way as to reduce a change of the tone of the target pixel.

14 Claims, 16 Drawing Sheets

| V11 | V12 | V13 | V14 | V15 |
|-----|-----|-----|-----|-----|
| V21 | V22 | V23 | V24 | V25 |
| V31 | V32 | V33 | V34 | V35 |
| V41 | V42 | V43 | V44 | V45 |
| V51 | V52 | V53 | V54 | V55 |

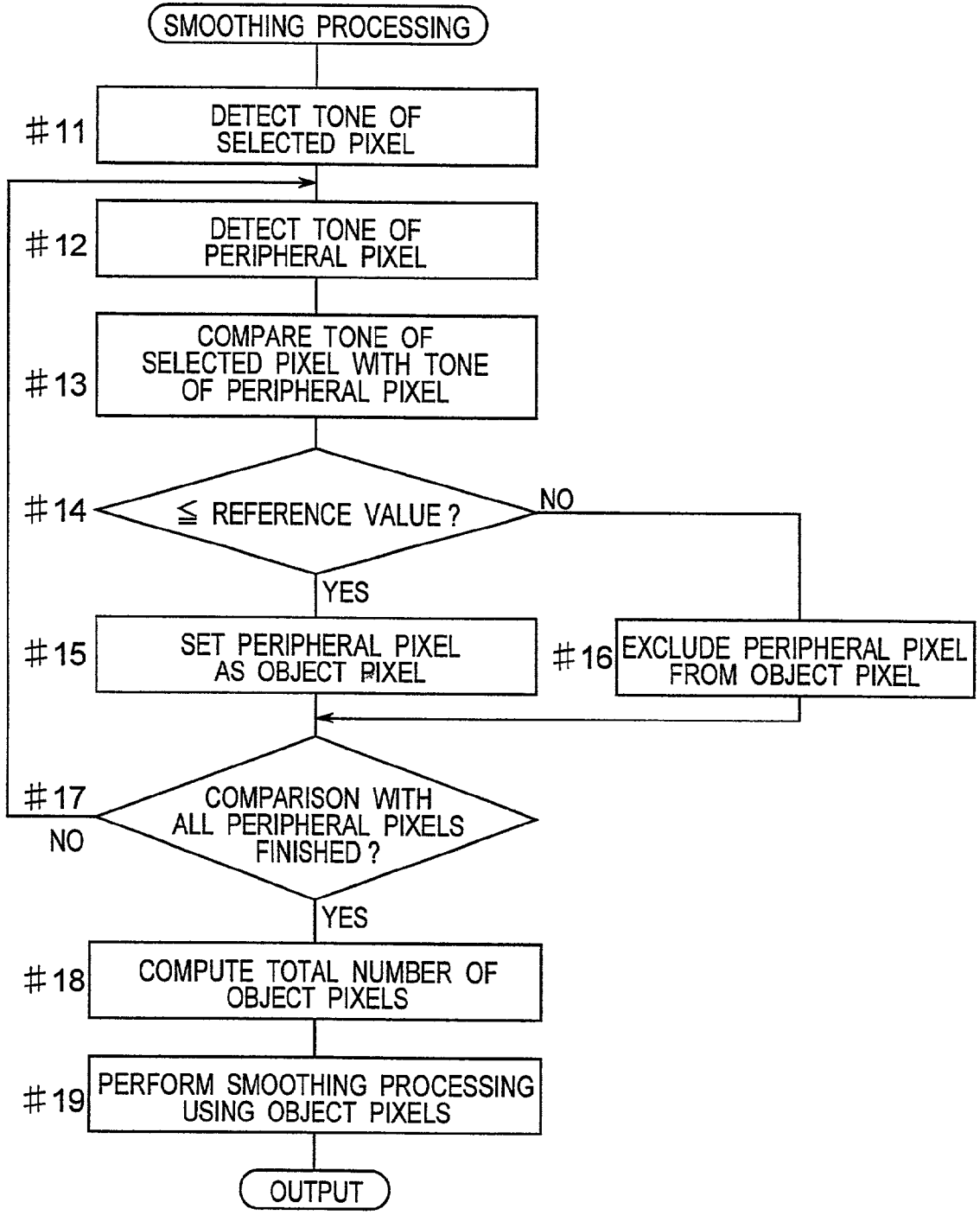

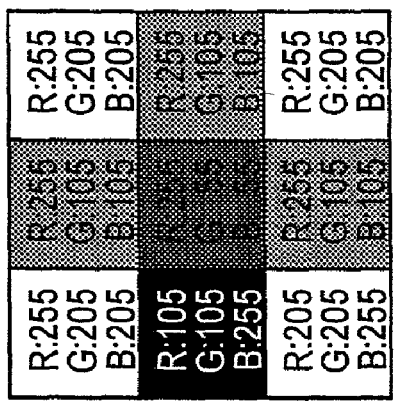
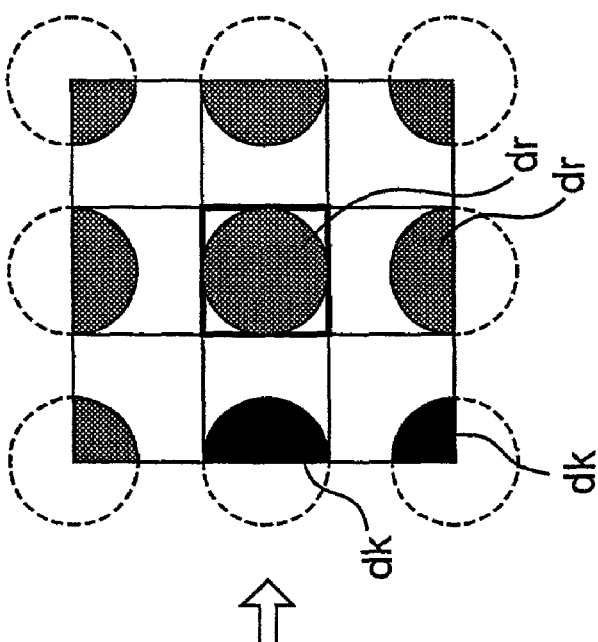
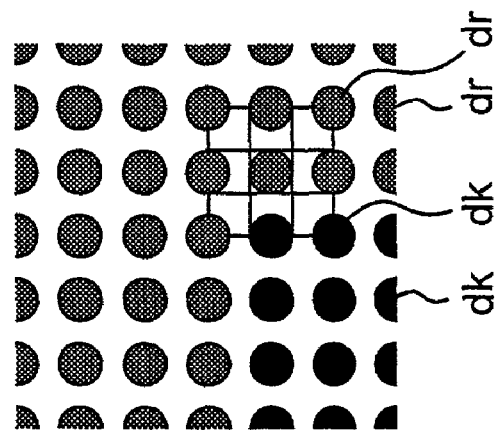

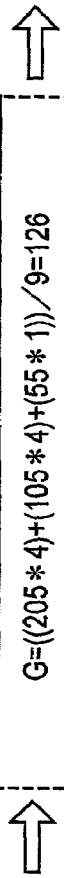

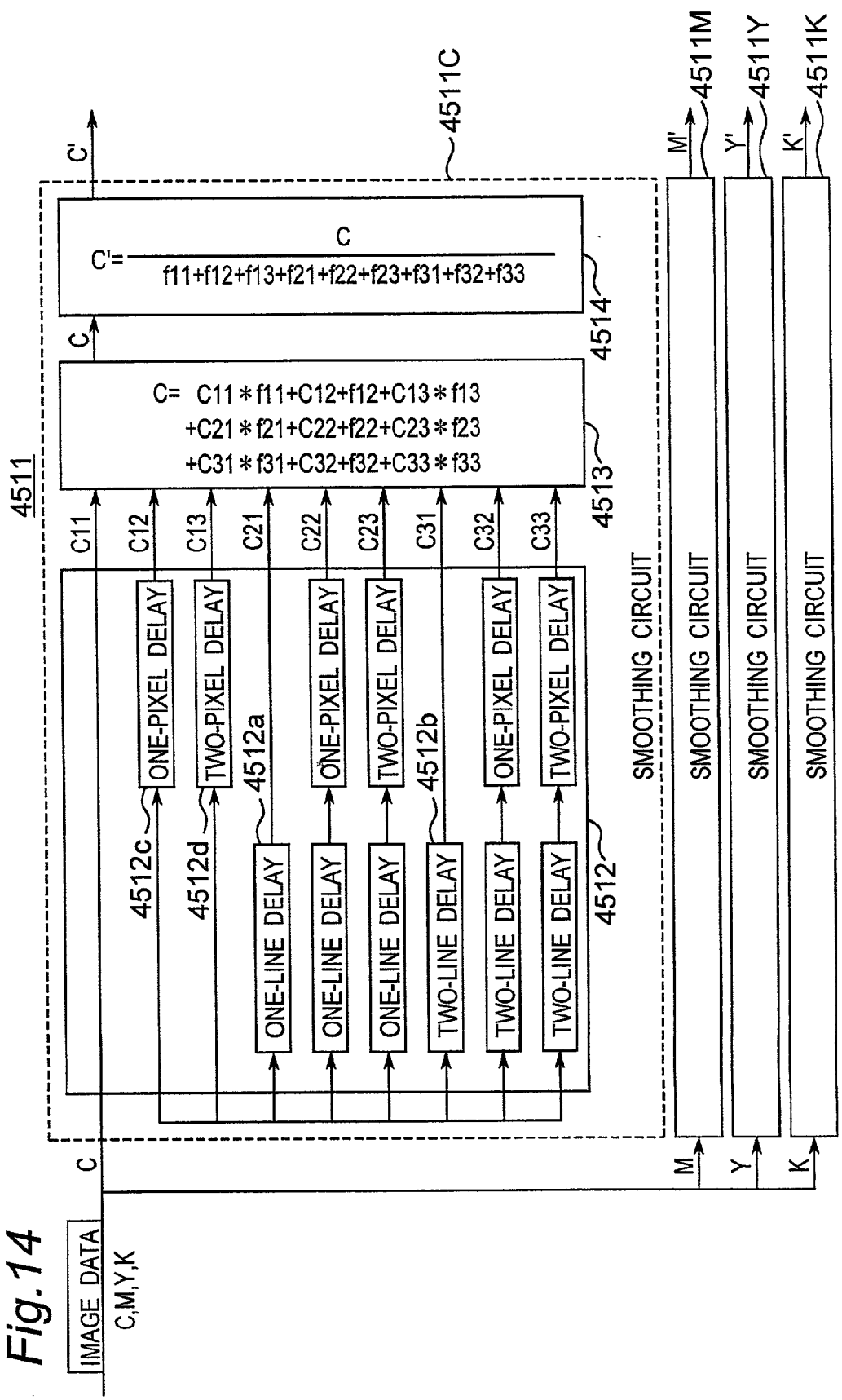

Fig. 15A
| R:255 | R:255 | R:255 |
|---|---|---|
| R:255 | R:255 | R:255 |
| R:255 | R:105 | R:205 |
Fig. 15B
| 1 | 1 | 1 |
|---|---|---|
| 1 | 1 | 1 |
| 1 | | |
Fig. 15C
R=(255*7)/7=255
Fig. 16A
| R:255 | R:255 | R:255 |
|---|---|---|
| R:255 | R:255 | R:255 |
| R:255 | R:105 | R:205 |
Fig. 16B
| 1 | 1 | 1 |
|---|---|---|
| 1 | 1 | 1 |
| 1 | 0 | 0 |
Fig. 16C
R=((255*7)+(105*0)+(205*0))/9=198
Fig. 17A
| R:255 | R:255 | R:255 |
|---|---|---|
| R:255 | R:255 | R:255 |
| R:255 | R:105 | R:205 |
Fig. 17B
| 1.28 | 1.28 | 1.28 |
|---|---|---|
| 1.28 | 1.28 | 1.28 |
| 1.28 | 0 | 0 |
Fig. 17C
R=((255*7*1.28)+(105*0)+(205*0))/9=254

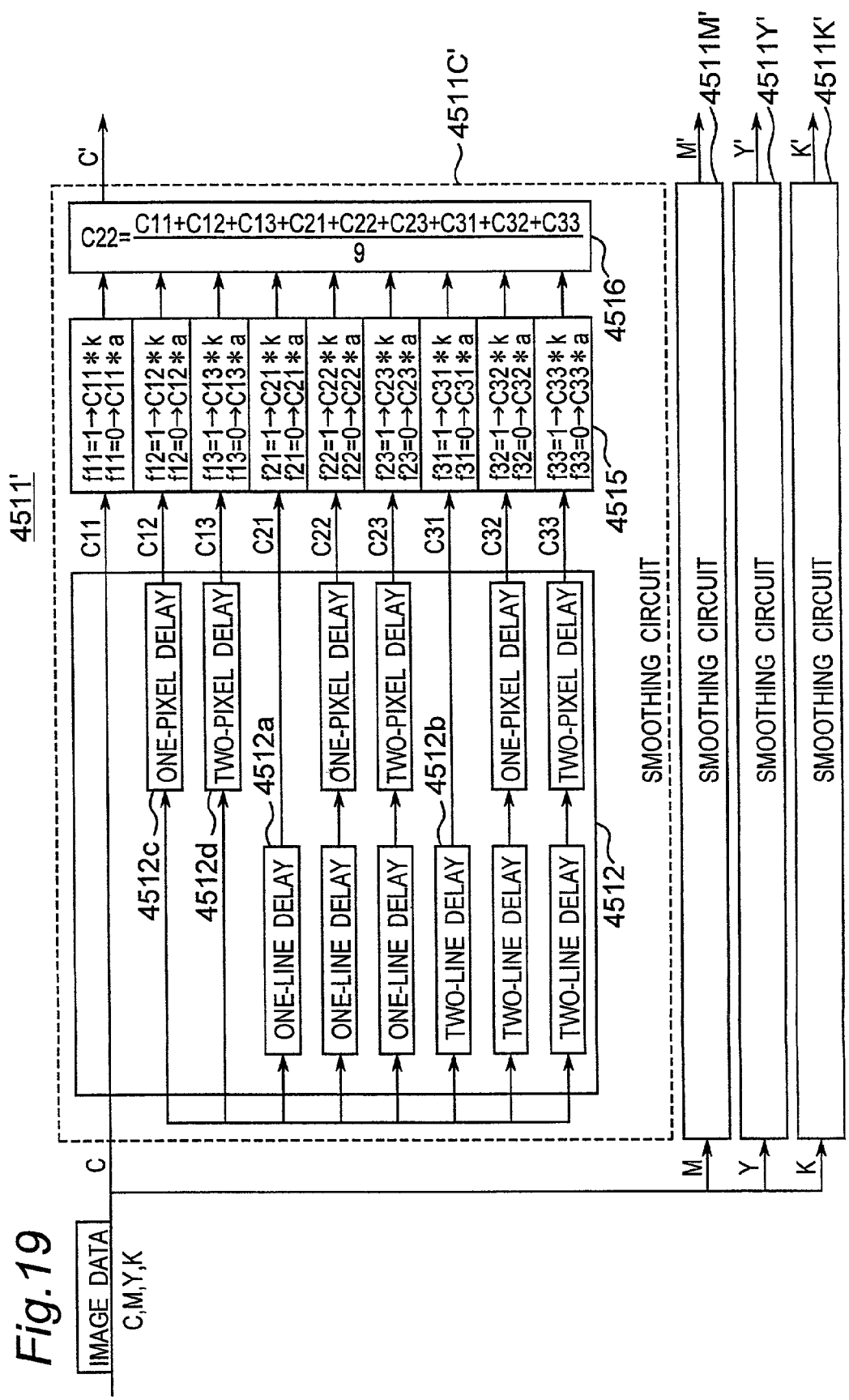

IMAGE PROCESSING APPARATUS, IMAGE PROCESSING METHOD, AND COMPUTER PROGRAM PRODUCT THEREFOR

This application is based on application No. 2001-160741 filed in Japan, the entire content of which is hereby incorporated by reference.

BACKGROUND OF THE INVENTION

The present invention relates to an image processing apparatus, an image processing method, and a computer program product by which smoothing processing is performed for input image data.

In a known image processing apparatus, to prevent moire from being generated in an image showing dots, average values of each of lightness data R (red), G (green), and B (blue) of a target pixel and pixels in the periphery of the target pixel are computed, and the lightness data R, G, and B of the target pixel are replaced with the corresponding computed average values to thereby execute smoothing processing upon the image. In another known image processing apparatus, weighted average values of each of the lightness data R, G, and B of the target pixel and the pixels on the periphery thereof are computed, and the lightness data of the target pixel are replaced with the computed average values.

However the conventional image processing apparatuses have the following problem: If an input image has a black character drawn in a region of color dots, a black character portion of the target pixel is replaced with an average value of the black character and color dots around the black character. Thus as a result of the execution of the smoothing processing, the black mixes with the colors of the color dots around the black character. Consequently the black character is blurred and the visibility of the black character deteriorates. In addition to this problem caused by dots, the conventional image-processing apparatuses have a problem in executing the smoothing processing upon for an image such as a photographic image in which importance is given to gradation. The problem is that when peripheral pixels in the periphery of the target pixel are much different in their tone from that of the target pixel, the tone of the target pixel is changed by the influence of the tone of the peripheral pixels.

SUMMARY OF THE INVENTION

Therefore, it is an object of the present invention to provide an image processing apparatus, an image processing method, and a computer program product capable of executing smoothing processing while suppressing a change in tone.

In an image processing apparatus according to an aspect of the present invention, a smoothing means executes smoothing processing upon image data of a target pixel. A tone detection means detects a tone of the target pixel and tones of peripheral pixels around the target pixel. A tone difference detection means detects a tone difference between the target pixel and each peripheral pixel. A control means controls the smoothing means, based on the tone difference between the target pixel and each peripheral pixel, to perform the smoothing processing of the target pixel in such a way as to reduce a change of the tone of the target pixel. Therefore it is possible to restrain the tone from being changed by the smoothing processing.

For a dot region, which is a region of dots, it is necessary to execute the smoothing processing such that moire is not generated. Thus in one embodiment, a region detection means determines whether the target pixel is present in a dot region. When the region detection means determines that the target pixel is present in the dot region, the smoothing means executes smoothing processing of the target pixel. Therefore it is possible to prevent the generation of moire in the dot region. In addition, it is possible to prevent a tone from being added to a black character present in a region of color dots, so that the black character is prevented from being blurred.

In one embodiment, the control means excludes a peripheral pixel having a tone difference larger than a predetermined value from the target pixel, from an object pixel contributing to the smoothing processing of the target pixel. Consequently no contribution to the smoothing processing of the target pixel is made by the peripheral pixel having a tone difference larger than the predetermined value from the target pixel. Accordingly it is possible to effectively restrain the tone of the target pixel from being affected or changed by the smoothing processing.

In one embodiment, the control means switches a filter coefficient for smoothing processing of the target pixel when a peripheral pixel having a tone difference larger than a predetermined value from the target pixel is present in a predetermined region around the target pixel. The term "filter coefficient" used herein means a weighting coefficient for determining the degree of contribution of a peripheral pixel to the smoothing processing for the target pixel.

Owing to appropriate switching of the filter coefficient, it is possible to effectively restrain the target pixel from being changed in its tone by the smoothing processing. For example, by setting the filter coefficient for the peripheral pixel having a tone difference from the target pixel larger than the predetermined value to zero, no contribution to the smoothing processing of the target pixel is made by that peripheral pixel. Further, if the setting of the filter coefficient to zero is accompanied with increasing the filter coefficients of the remaining peripheral pixels in the predetermined region around the target pixel, it is possible to effectively restrain the density level (or lightness level) of the target pixel from being changed by the smoothing processing.

In one embodiment, the smoothing means replaces image data of a target pixel with an average value of the image data of the target pixel and image data of the peripheral pixels.

In one embodiment, the smoothing means replaces the image data of the target pixel with a weighted average value of the image data of the target pixel and the image data of the peripheral pixels. At this time, the control means may set a weight to zero for a peripheral pixel having a tone difference from the target pixel larger than a reference value. Alternatively, the control means may change the weight for a peripheral pixel, according to the tone difference of the peripheral pixel from the target pixel.

In one embodiment, the smoothing means replaces image data of the target pixel with an average value of image data of the target pixel and image data of peripheral pixels having a tone difference from the target pixel smaller than a reference value.

In an image processing method according to another aspect of the present invention, initially a tone of a target pixel and tones of peripheral pixels present around the target pixel are detected. Thereafter a tone difference between the target pixel and each peripheral pixel is detected. Based on the tone differences between the target pixel and the peripheral pixels, smoothing processing is executed in such a way as to reduce a change of the tone of the target pixel.

Therefore it is possible to restrain the tone of the target pixel from being changed by the smoothing processing.

In one embodiment, whether the target pixel is present in a dot region is determined. When it is determined that the target pixel is present in the dot region, smoothing processing of the target pixel is executed. Therefore it is possible to prevent the generation of moire in the dot region. In addition, it is possible to prevent a tone from being added to a black character present in a region of color dots, so that the black character is prevented from being blurred.

In one embodiment, a peripheral pixel having a tone difference larger than a predetermined value from the target pixel is excluded from an object pixel contributing to the smoothing processing of the target pixel. As a result, no contribution to the smoothing processing of the target pixel is made by the peripheral pixel having a tone difference larger than the predetermined value from the target pixel. Accordingly it is possible to effectively restrain the smoothing processing from changing the tone of the target pixel.

In one embodiment, a filter coefficient used for the smoothing processing of the target pixel is switched when a peripheral pixel having a tone difference larger than a predetermined value from the target pixel is present in a predetermined region around the target pixel. The proper switching of the filter coefficient effectively suppresses a change in the tone of the target pixel which would be caused by the smoothing processing.

A computer program product according to a further aspect of the present invention comprises a computer-readable medium and a computer program recorded on the computer-readable medium. The computer program is for performing the steps of:

detecting a tone of a target pixel and tones of peripheral pixels around the target pixel;

detecting a tone difference between the target pixel and each peripheral pixel; and executing smoothing processing upon image data of the target pixel, based on the tone differences between the target pixel and the peripheral pixels, in such a way as to reduce a change of the tone of the target pixel.

The use of the computer program product in a computer realizes the image-processing apparatus and method of the present invention.

Other objects, features and advantages of the present invention will be obvious from the following description.

BRIEF DESCRIPTION OF THE DRAWINGS

The present invention will become more fully understood from the detailed description given hereinbelow and the accompanying drawings which are given by way of illustration only, and thus are not limitative of the present invention, and therein:

FIG. 10 is a flowchart showing an example of smoothing processing;

FIGS. 11A, 11B, and 11C show image data before subjected to smoothing processing, wherein FIG. 11A shows an original document having dots, FIG. 11B is an enlarged view of a window and FIG. 11C shows gradation data as read;

FIGS. 12A, 12B and 12C are views explaining that the conventional smoothing processing causes a change in tone;

FIGS. 12D, 12E and 12F are views explaining that the smoothing processing in the embodiment of the present invention is capable of suppressing the change in tone;

FIG. 14 shows the construction of a smoother included in the image corrector;

FIGS. 15A–15C are views for explaining the function of filter coefficients, wherein FIG. 15A shows image data, FIG. 15B shows filter coefficients for smoothing processing, and FIG. 15C shows a computation example;

FIGS. 16A–16C are views for explaining the function of filter coefficients, wherein FIG. 16A shows image data, FIG. 16B shows filter coefficients for smoothing processing, and FIG. 16C shows a computation example;

FIGS. 17A–17C are views for explaining the function of filter coefficients, wherein FIG. 17A shows image data, FIG. 17B shows filter coefficients for smoothing processing, and FIG. 17C shows a computation example;

FIG. 19 shows the construction of a smoother performing the smoothing processing shown in FIG. 18.

DETAILED DESCRIPTION OF THE PREFERRED EMBODIMENTS

Embodiments of the present invention will be described below in detail with reference to the drawings.

(1) Entire Construction of Image-Forming Apparatus

Figure 1:
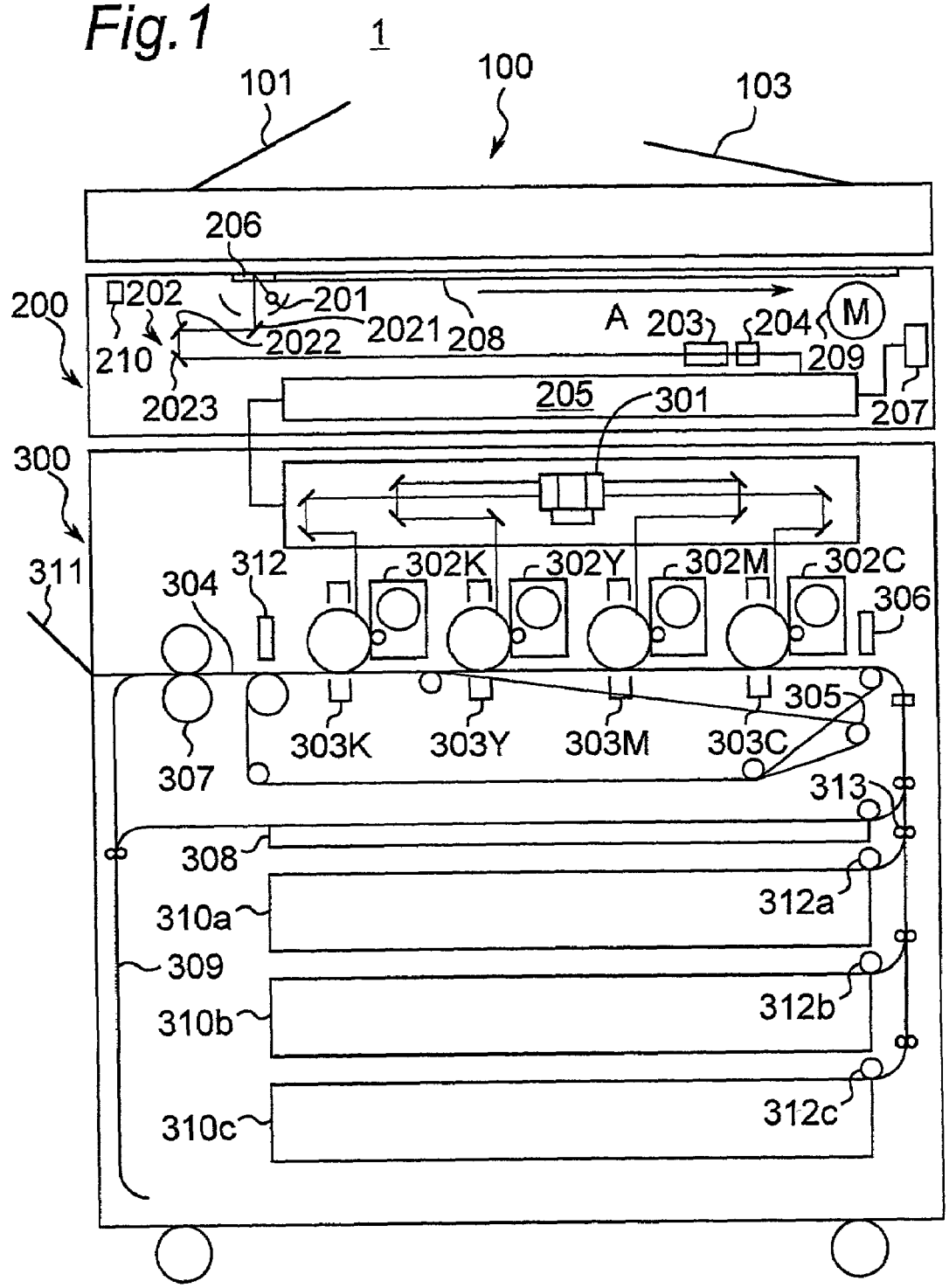
FIG. 1 is a schematic sectional view showing the entire construction of a full color copying machine according to an embodiment of the present invention.

FIG. 1 is a schematic sectional view showing the entire construction of a full color copying machine 1 (hereinafter, simply "copying machine") as an example of the image processing apparatus of the present invention.

The copying machine 1 has a function of forming an image in an image-forming station 300 by using digital image data of an original document read by an image read station 200. An automatic document feeder 100 is disposed over the image read station 200. Normally, in the copying machine, the image read station 200 reads the original document fed to an image-reading position by the automatic document feeder 100, and obtained image data is transferred to the image-forming station 300 in which an image is formed on a sheet of recording paper. The copying machine 1 can be connected to an external apparatus such as a personal computer through an interface 207. Thereby it is possible to realize a scanner function of outputting the image data read by the image read station 200 to the external apparatus and a printer function of forming an image by the image-forming station 300 by using image data supplied to the copying machine 1 from the external apparatus.

The automatic document feeder 100 feeds an original document set on a document tray 101 to a document-reading position. After the original document is read, the original document is discharged to a document discharge tray 103. A document feeding operation is performed according to an instruction transmitted from an operation panel. An original document discharge operation is performed in response to a read termination signal transmitted from the image read station 200. In the case where a plurality of sheets of an original document are set on the document tray 101, the operations of feeding, reading, and discharging the sheets of the original document are sequentially executed according to control signals consecutively generated.

In the image read station 200, an exposure lamp 201 irradiates the original document placed on a document glass 208. Light reflected from the original document is focused on a CCD sensor 204 through a group 202 of first–third mirrors 2021–2023 and a lens 203. A scan motor 209 drives the exposure lamp 201 and the first mirror 2021 to move in a direction shown with an arrow A at a speed V in accordance with a copying magnification or scaling. Thereby the entire surface of the original document on the document glass 208 is scanned. As the exposure lamp 201 and the first mirror 2021 perform the scanning operation, the second mirror 2022 and the third mirror 2023 move at a speed of V/2 in the direction shown with the arrow A. The position of the exposure lamp 201 is controlled by computing the position from its movement distance from its home position, namely, from the number of steps of the scan motor 209 and a detection signal outputted from a scan home sensor 210. The light reflected from the original document enters the CCD sensor 204 and is converted into an electric signal in the CCD sensor 204. The electric signal is subjected to analog processing, AD conversion, and digital image processing in an image-processing section 205. Then the signal is sent to the interface 207 and the image-forming station 300. Separately from the original document-reading position on the document glass 208, a white shading correction plate 206 is disposed in the image read station 200. Prior to reading of image information of the original document, the shading correction plate 206 is read to generate data for shading correction.

The image-forming station 300 will be described below. Initially exposure and imaging will be described below.

Image data sent from the image read station 200 or the interface 207 is converted into printing data of the different colors of cyan (C), magenta (M), yellow (Y), and black (K). The printing data are sent to a control portion of exposure heads which are not shown. The control portion of each of the exposure heads operates a laser, according to a pixel value of the image data sent thereto. Emitted laser beams are made to scan one-dimensionally by a polygon mirror 301 to expose the surface of a photosensitive member inside each of imaging units 302C, 302M, 302Y, and 302K.

Elements necessary for performing an electrophotographic process are disposed around the associated photosensitive member in each of the imaging units 302C–302K. The electrophotographic process is performed consecutively by a clockwise rotation of the photosensitive members for each of C, M, Y, and K. The imaging units 302C–302K necessary for image formation are unitary for each color, so that the imaging units 302C–302K are removable from the copying machine, independent of each other. A latent image formed by the exposure is developed by developing units for each color on the surface of each photosensitive member disposed in the imaging units 302C–302K. By transfer chargers 303C–303K disposed in confrontation with the photosensitive member and under a paper transfer belt 304, a toner image formed on the surface of the photosensitive member by the development is transferred to a sheet of the recording paper which is fed by the paper transfer belt 303.

The supply and transportation of the recording paper and the fixing operation are described below. The recording paper to which the toner image is transferred is supplied to an image transfer position in the following order to form an image thereon. The recording papers of several sizes are set in paper supply cassettes 310a–310c. The desired recording paper is supplied to a transportation path by paper supply rollers 312a–312c mounted on the paper supply cassettes 310a–310c respectively.

A pair of transportation rollers 313 transfer the recording paper supplied to the transportation path to the paper transfer belt 304. A timing sensor 306 detects a reference mark on the paper transfer belt 304 to adjust a transfer timing of the recording paper to be transferred. Three register correction sensors 312 are arranged along a main scanning direction at the downstream side of the imaging units 302C–302K relative to the recording paper-transfer direction. When a register pattern is formed on the paper transfer belt 304, the resist correction sensors 312 detect an out-of-register amount of the images of each of the colors C, M, Y, and K in main and auxiliary scanning directions. A print image control (PIC) part executes correction of a drawing position and an image distortion to prevent out-of-register colors on the recording paper. The toner image transferred to the recording paper is heated and fused by a pair of fixing rollers 307 and fixed to the recording paper. Then the recording paper is ejected to a discharge tray 311.

In the case where an image is formed on both surfaces of the recording paper, to form an image on the back surface thereof, a paper-reversing unit 309 reverses the recording paper to which the toner image has been fixed by the pair of fixing rollers 307. Then the recording paper is guided by a both-surface printing unit 308 to the transportation path again. Owing to a vertical movement of a belt retreat roller 305, the paper transfer belt 304 is capable of retreating from the imaging units 302C, 302M, and 302Y. Thereby the paper transfer belt 304 is prevented from contacting the photosensitive members for the respective colors. That is, when a monochrome image is formed, because the operation of the imaging units 302C, 302M, and 302Y is stopped, it is possible to prevent the photosensitive members and other parts from being worn.

(2) Construction of Image-Processing Section 205

Figure 2:
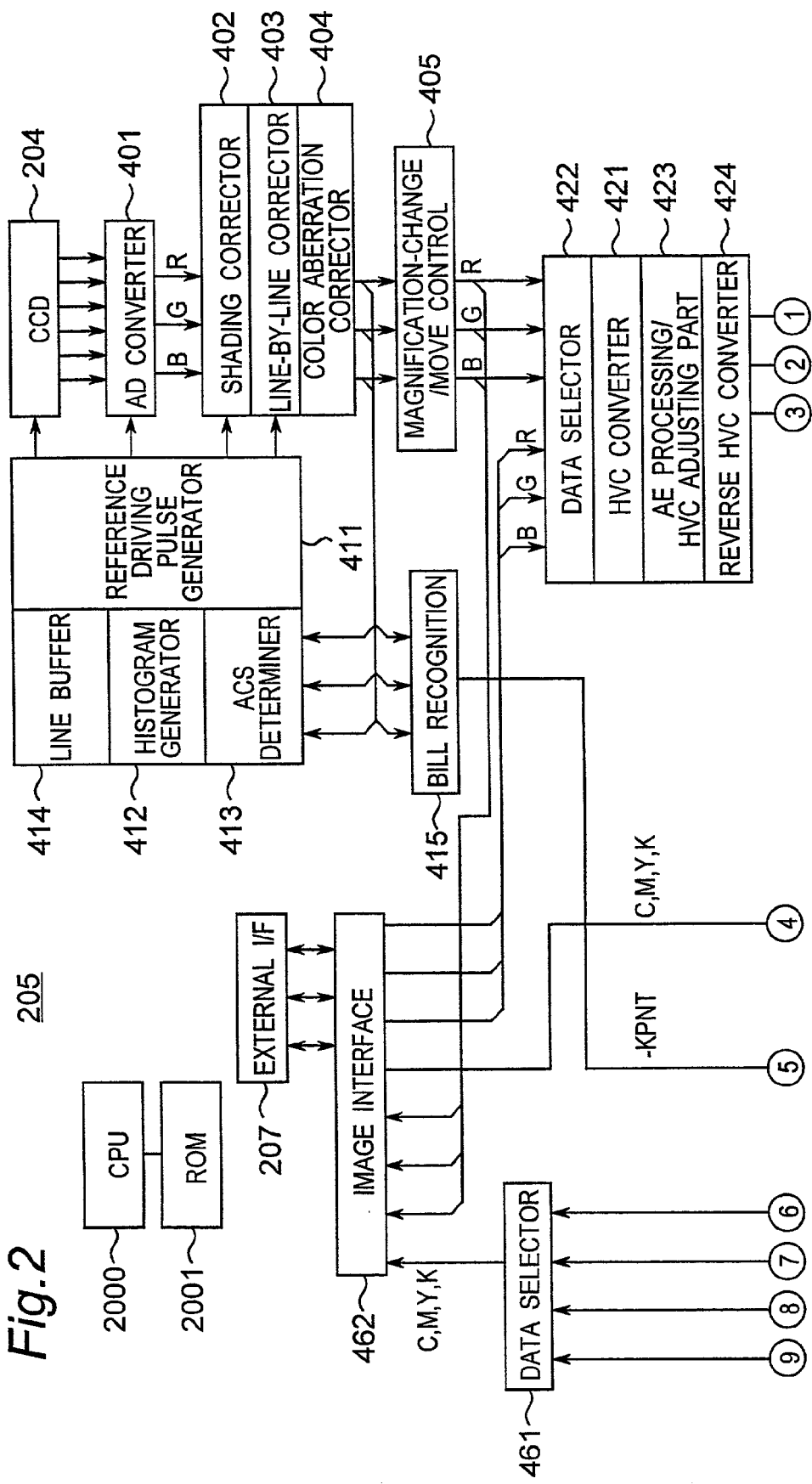
FIG. 2 shows the construction of an image processor of the copying machine of FIG. 1.
Figure 3:
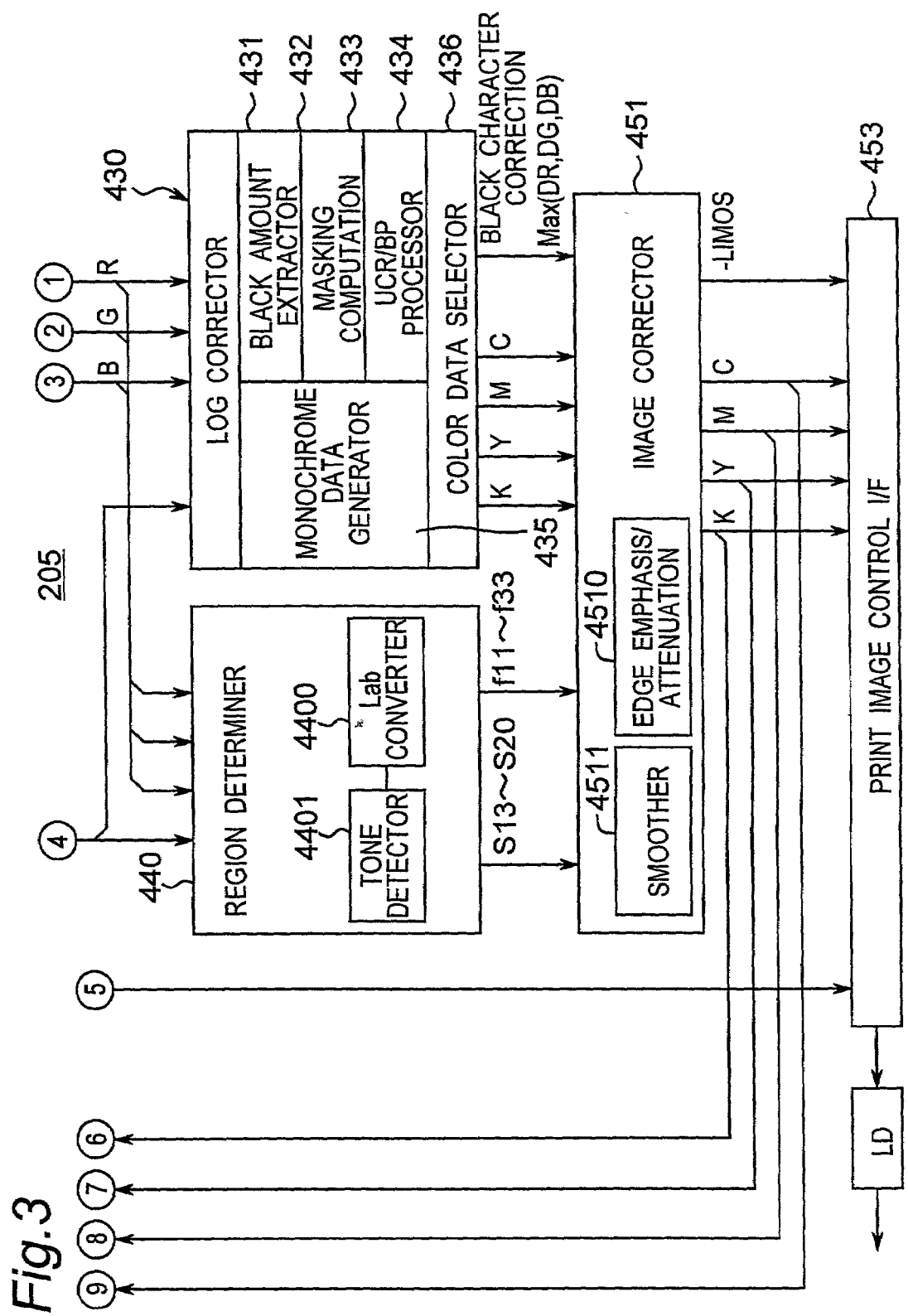
FIG. 3 also shows the construction of the image processor of the copying machine of FIG. 1.

The content of signal processing which is executed by the image-processing section 205 provided in the image read station 200 will be described below. FIGS. 2 and 3 are functional block diagrams showing the construction of the image processing section 205. A CPU (central processing unit) 2000 serving as a control means controls entire signal processing of the image-processing section 205. A program that is executed by the CPU 2000 is stored in a ROM (read only memory).

The CCD sensor 204 shown in FIG. 2 separates light reflected from the surface of the original document into electric signals corresponding to colors R, G, and B in accordance with an intensity of the light. The read resolution of the CCD sensor 204 can be switched among 400 dpi, 600 dpi, 800 dpi, and 1200 dpi. Based on a timing signal outputted from a reference driving pulse generator 411, an AD converter 401 converts an analog signal outputted thereto from the CCD sensor 204 into 8-bit digital data, namely, 256-gradation digital data for information of each of the colors R, G, and B.

A shading corrector 402 executes correction to eliminate non-uniformity of an optical amount of the image data of each of the colors R, G, and B in the main scanning direction. To perform the shading correction, a shading correction plate 206 is read for each of the colors R, G, and B, and obtained data for each color are stored as reference data in a shading memory provided in the shading corrector 402. More specifically, when an original document is scanned, the correction can be accomplished by performing a reciprocal conversion of the reference data and multiplying the thus obtained value by image data.

To make read positions of sensor chips for the colors R, G, and B in the scanning direction coincident with each other, in accordance with a scanning speed, a line-by-line corrector 403 executes a delay control of the image data of each color line by line by using a field memory provided therein.

Owing to a chromatic aberration phenomenon generated by an optical lens, a read phase difference among the colors R, G, and B becomes larger toward the edge of the original document in the main scanning direction. Thereby there is a possibility that in addition to a color deviation, an erroneous determination is made in, for example, an automatic color selection (ACS) determination which will be described later. Thus based on saturation information, a color aberration corrector 404 corrects the phase difference among the colors R, G, and B.

By using two magnification-change line memories for the image data of each of the colors R, G, and B, a magnification-change/move control part 405 executes a magnification change/movement processing in the main scanning direction by alternately operating an input and an output of the line memories every line and independently controlling write and read timing of the magnification-change line memories. That is, the magnification-change/move control part 405 executes a minification or reduction by thinning out data when the data is written to the memory and executes a magnification or enlargement by padding data when the data is read from the memory. To prevent image loss and non-smoothness, the magnification-change/move control part 405 executes an interpolation processing before the data is written to the memories when reduction is executed, and after the data is read therefrom when enlargement is executed. By combining the block control with the scan control, the magnification-change/move control part 405 executes not only the enlargement and reduction, but also processing of centering, image repeat, and minification or reduction for making a binding margin.

A histogram generator 412 generates lightness data from the image data of each of the colors R, G, and B obtained by executing pre-scanning before an operation of copying the original document is performed. Then, the histogram generator 412 generates a histogram of lightness on a memory. On the other hand, an automatic color selection (ACS) determiner 413 determines whether or not each dot is a color dot, based on saturation data, and generates on a memory the number of color dots for each block having 512 dots square on the original document. Based on the result, a copy ground level automatic control (AE processing) and an automatic color selection (color or monochrome copying operation) is executed.

A line buffer 414 has a memory capable of storing one line of the image data of each of the colors R, G, and B read by the image read station 200. Thus, the line buffer 414 is adapted to monitor the image data to execute image analysis for an automatic sensitivity correction and an automatic clamp correction for the CCD sensor 204 of the AD converter 401.

When securities such as a bill or the like are placed on the document glass 208 and a copying operation is performed, a bill recognition part 415 executes cutout of a data region of each of the colors R, G, and B and determines whether the original document is a bill or not by pattern matching to thereby prevent the image thereof from being well formed. If the bill recognition part 415 determines that the original document is a bill, the CPU controlling the read operation of the image read station 200 and the image-processing section 205 outputs a solid black signal (–KPNT="L") to the print image control part immediately. The print image control part switches data K to solid black to prohibit a normal copying operation from being performed.

An HVC converter 421 performs a 3*3 matrix calculation from the data of each of the colors R, G, and B inputted thereto through a data selector 422 to convert the data of each of the colors R, G, and B into lightness (data V) signal and a color difference signal (data Cr, Cb).

An AE processing part 423 corrects the data V, based on a value of the ground level control and corrects the data Cr and Cb in accordance with a saturation level and a hue level set on the operation panel. Thereafter a reverse HVC converter 424 performs a reverse 3*3 matrix calculation to reconvert the data V, Cr, and Cb into the data of each of the colors R, G, and B.

In a color corrector 430 shown in FIG. 3, a LOG corrector 431 converts the data of each of the colors R, G, and B into density data (data DR, DG, DB). Then, a black amount extractor 432 detects minimum color levels of the data DR, DG, and DB as the under color components of the original document and at the same time detects a gradation level difference between a maximum color of each of the colors R, G, and B and a minimum color thereof as the saturation data of the original document.

A masking computation portion 433 performs a nonlinear 3*6 matrix calculation of the data DR, DG, and DB to convert the data DR, DG, and DB into color data (data C, M, Y, K) matching respective color toners of the printer.

For each of the under color components (Min (R, G, B)) of the original document, a under color removal/black painting (referred to as "UCR/BP") processor 434 computes UCR/BP coefficients corresponding to the saturation data of the original document, decides the amounts of UCR/BP by performing multiplication, and subtracts under color removal (UCR) amounts from the corresponding data C, M, Y obtained by the masking computation to thereby obtain data C, M, Y and data K (=amount of BP). A monochrome data generator 435 generates lightness components from the data of each of the colors R, G, and B, executes a LOG correction, and outputs black data (data DV). Finally a color data selector 436 selects the data C, M, Y, K indicating a color copy image or the data DV (C, M, Y are white) indicating a monochrome copy image.

Based on the image data of each of the colors R, G, and B inputted to a region determiner 440 through the data selector 422, the region determiner 440 determines on each of pixels whether the pixel is present in a character edge region, whether the pixel is present in a dot region, whether the pixel is present in a character edge region included in a dot region (often referred to as "in-dot character edge region"), whether the pixel present in the character edge region is a color pixel, whether the dot region is a color region, etc. Then the region determiner 440 outputs region determination signals S13–S20 indicating the determination results. The region determiner 440 has a Lab converter 4400 converting the inputted data R, G, and B into data L, a, and b in a uniform color space Lab and a tone detector 4401 capable of detecting the tone of each pixel, based on the data L, a, and b. The detailed construction of the region determiner 440 will be described later.

An image corrector 451 has an edge emphasis/attenuation portion 4510 and a smoother 4511, whereby based on the region determination signals S13–S20 and tone-difference detection signals f11–f33 outputted from the region determiner 440, the image corrector 451 executes correction processing such as edge emphasis processing and smoothing processing, if necessary, upon the data C, M, Y, and K outputted from the color corrector 430. Detailed description will be made on what kind of correction processing is executed for which of the outputted determination signals S13–S20 and the tone-difference detection signals f11–f33. The image corrector 451 corrects the images of each data C, M, Y, and K in correspondence to a sharpness, a color balance, and a gamma level designated through the operational panel, and transfers a gradation reproduction attribute signal –LOMOS to a print image control interface 453. The image corrector 451 also sends the data C, M, Y, and K to an image interface 462 shown in FIG. 2 through a data selector 461 also shown in FIG. 2.

The image interface 462 is a part through which image data is input from or output to an external apparatus. The image interface 462 allows simultaneous input and output of the data of each of the colors R, G, and B and sequential input and output of the data C, M, Y, and K. The external equipment is allowed to utilize the scanner function and the printer function of the copying machine 1.

(3) Construction of Region Determiner 440

Figure 4:
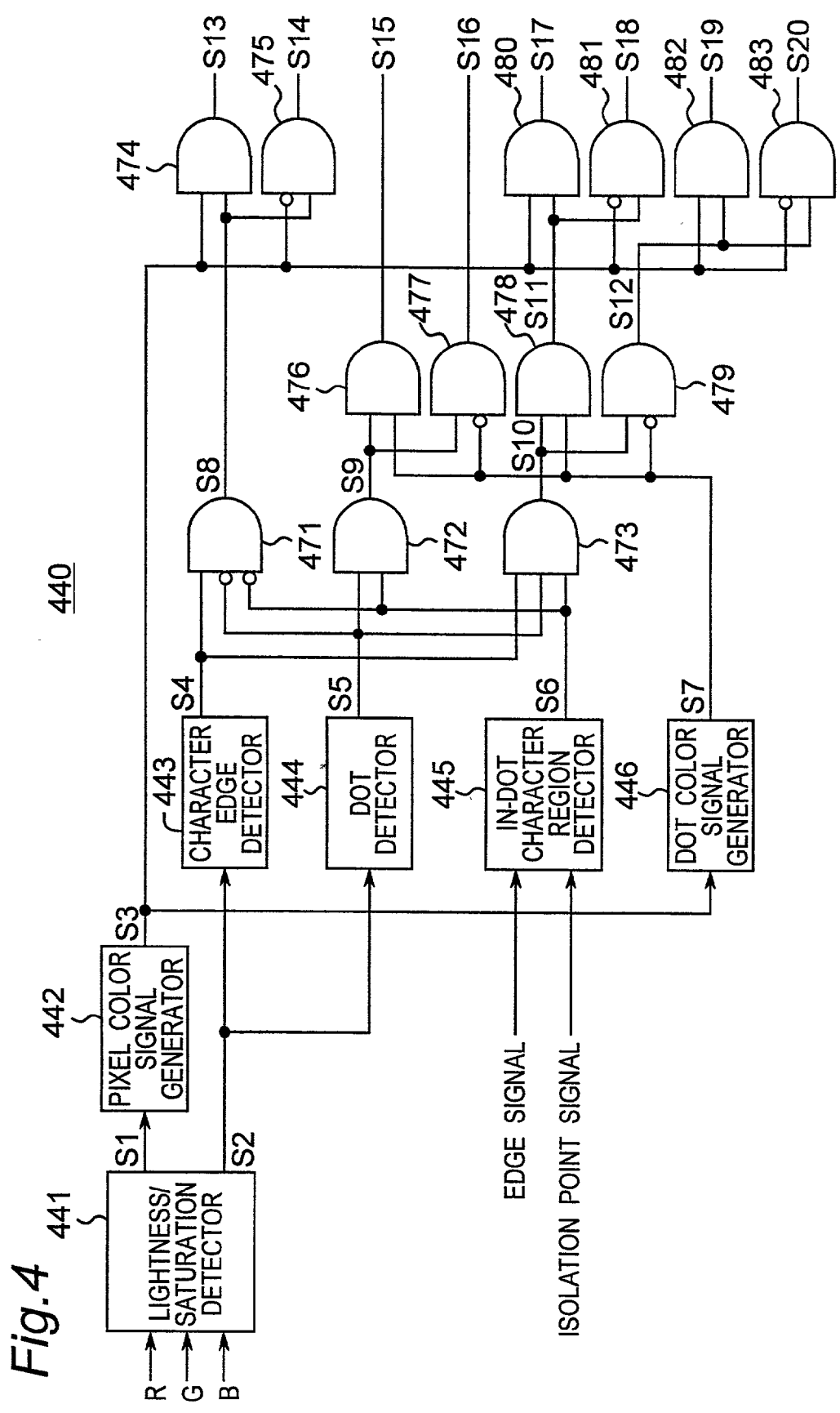
FIG. 4 shows the construction of a region determiner included in the image processor.

FIG. 4 shows the construction of the region determiner 440. Based on each color data R, G, and B, the region determiner 440 determines to what kind of region a pixel that is an object of a region determination (hereinafter referred to as simply "object pixel") belongs, and outputs the region determination signals S13–S20 to the image corrector 451. Based on the region determination signals S13–S20, the image corrector 451 executes the correction processing, such as the edge emphasis processing and the smoothing processing, if necessary, upon the data C, M, Y, and K outputted from the color corrector 430.

The region determiner 440 has a lightness/saturation detector 441, a pixel color signal generator 442, a character edge detector 443, a dot detector 444, an in-dot character region detector 445, and a dot color signal generator 446. At the subsequent stages of these constituent portions, the region determiner 440 further has logic circuits to process outputs from these constituent portions and thereby output the region determination signals S13–S20. Contents of processings performed by each of these constituent parts will be described in detail below.

The lightness/saturation detector 441 converts data of each of the colors R, G, and B (data of reflected light) into the data L, a, and b to generate saturation (W) data S1 and lightness (L) data S2. The saturation (W) can be computed by using Expression (1) shown below:

$$w = \sqrt{a^2 + b^2} \qquad (1)$$

The pixel-color signal generator 442 compares the saturation (W) computed from Expression (1) with a predetermined threshold value REF1. If the value of the saturation (W) is larger than the predetermined threshold value REF1, an output signal S3 of the pixel-color signal generator 442 is high. If the value of the saturation (W) is not larger than the predetermined threshold value REF1, the output signal S3 thereof is low. When the output signal S3 is high, this signal indicates that the object pixel is a color pixel.

The character edge detector 443 sets a window, having a predetermined size, in which the object pixel is centered. Based on the lightness (L) data generated by the lightness/saturation detector 441, the character edge detector 443 computes an edge amount by performing a primary differential or a secondary differential. Then, the character edge detector 443 compares the computed edge amount with a predetermined threshold value REF2. If the edge amount is larger than the predetermined threshold value REF2, the character edge detector 443 generates an output signal S4 at a high level. If the edge amount is not larger than the predetermined threshold value REF2, the output signal S4 becomes low. The output signal S4 of a high level indicates that the object pixel is a pixel in the character edge region.

Figure 5:
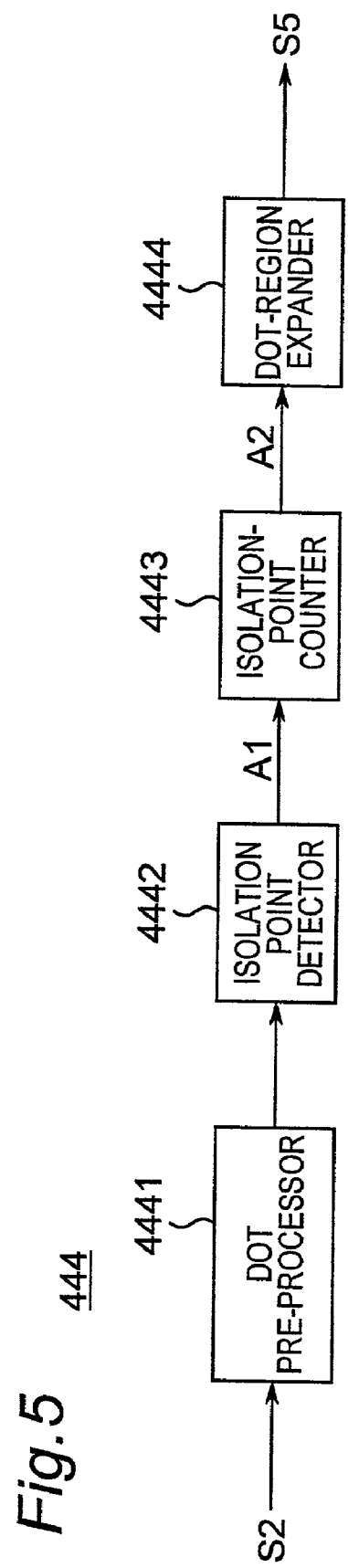
FIG. 5 shows the construction of a dot detector included in the region determiner.

The dot detector 444 outputs a signal S5 indicating whether the object pixel is present in a dot region. FIG. 5 is a functional block diagram showing the construction of the dot detector 444.

In dependence on a resolution of the image data, a dot pre-processor 4441 executes processing in such a way that the size of an isolation point included in the image data is smaller than the size of an isolation point detection filter which will be described later. More specifically, the dot pre-processor 4441 reduces the number of pixels by subjecting the lightness (L) data S2 to pixel-thinning processing. The construction of the dot pre-processor 4441 is described in detail in Japanese Patent Publication P2000-59616A which is incorporated herein by reference. The pixel-thinning processing allows the size of the isolation point to be in such a size as to be detected by using the isolation point detection filter for a resolution of 400 dpi, even though the resolution of the image data is as high as 600 dpi.

Figures 6, 7:
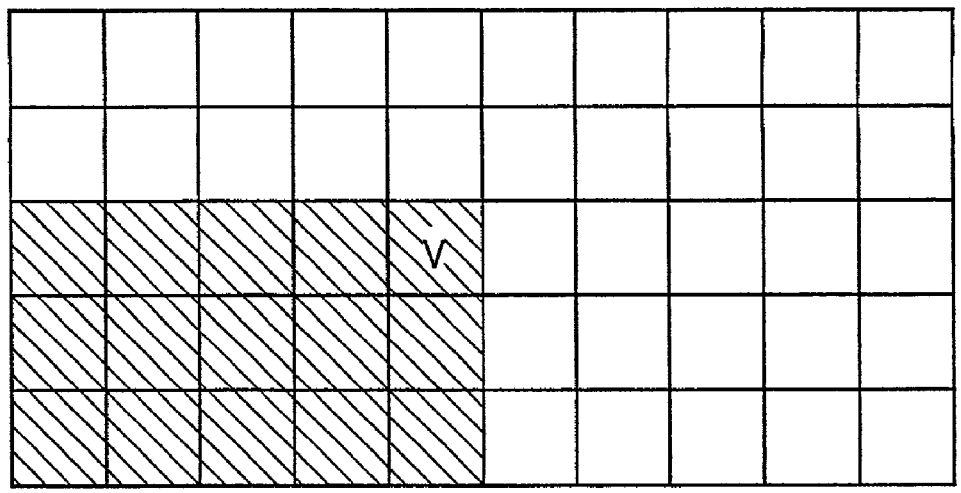
FIG. 6 shows a 5 pixels by 5 pixels window set by an isolation point detector to determine isolation points.
FIG. 7 shows a window set by a dot-region expander to expand a region of dots.

An isolation point detector 4442 sets a window, having a predetermined size, in which the object pixel is centered. Based on the result of a comparison between the lightness (L) data of the object pixel and that of pixels in the periphery of the object pixel, the isolation point detector 4442 determines whether the object pixel corresponds to the isolation point. With reference to FIG. 6, the content of the processing which is executed by the isolation point detector 4442 will be described below on the case where a window of five pixels by five pixels is set as the isolation point filter. In the example of FIG. 6, based on lightness (L) data L33 of an object pixel V33, and data L11–L15, L21–L25, . . . of thinning processing-subjected peripheral pixels V11–V15, V21–V25, . . ., the isolation point detector 4442 determines whether the object pixel V33 corresponds to the isolation point according to whether the lightness (L) data L33 satisfies Expressions (2), (3), or (4) shown below.

$$L33 > MAX\ (L22, L23, L24, L34, L44, L43, L42, L32) \qquad (2)$$

$$L33 > MAX\ (L11, L12, L13, L14, L15, L25, L35, L45, L55, L54, L53, L52, L51, L41, L31, L21) \qquad (3)$$

$$L33 > MAX\ \{(L11+L22)/2, (L13+L23)/2, (L15+L24)/2, (L55+L44)/2, (L53+L43)/2, (L51+L42)/2\} \qquad (4)$$

When the lightness (L) data L33 satisfies Expressions (2), (3), and (4), it is possible to determine that the object pixel V33 corresponds to a white isolation point. The term "white isolation point" means that a pixel having a high lightness is present isolatedly against pixels having a low lightness. Whether the object pixel 33 corresponds to a black isolation point (i.e., a pixel having a low lightness is present isolatedly against pixels having a high lightness) is determined by reversing the sign of inequality of each of the Expressions and altering a "MAX (maximum value)" to a "MIN (minimum value). The lightness (L) data L33 does not necessarily have to satisfy all of Expressions (2), (3), and (4), but it is possible to determine that the object pixel corresponds to the isolation point even in the case where the lightness (L) data L33 satisfies any one of Expressions (2), (3), and (4). For example, in the case where the lightness (L) data L33 satisfies Expressions (2) and (4), it may be determined that the object pixel corresponds to the isolation point. Other determination methods can be also used. For example, it is possible to use a logical OR of the computation results of Expressions (2) and (3).

An isolation-point counter 4443 sets a window, having a predetermined size, in which the object pixel is centered. Based on an output signal A1 of the isolation point detector 4442, the isolation-point counter 4443 counts the numbers of white isolation points and black isolation points in the window. The isolation-point counter 4443 compares the counted number of the white isolation points or the counted number of the black isolation points, whichever is larger, with a predetermined threshold value REF3. If the number of the isolation points is larger than the predetermined threshold value REF3, the isolation-point counter 4443 generates an output signal A2 of a high level. If the number of the isolation points is not larger than the predetermined threshold value REF3, the output signal A2 becomes low. The output signal A2 of a high level indicates that the object pixel is present in the dot region.

Based on the output signal A2 of the isolation-point counter 4443, a dot-region expander 4444 executes processing of expanding the dot region. In the case where the object pixel V is present in the periphery of the dot region, which is hatched in FIG. 7, it may occur that a value counted by the isolation-point counter 4443 becomes smaller than the threshold REF3, resulting in an erroneous determination that the object pixel is not present in the dot region. The dot region expansion is a processing for preventing such an erroneous determination.

More specifically, the dot-region expander 4444 sets a window, having a predetermined size, in which the object pixel is centered. If it is determined that a pixel at a predetermined position (hereinafter referred to as "reference pixel") inside the window is present in the dot region, the dot-region expander 4444 determines that the object pixel is also present in the dot region. A pixel at any desired position can be set as the reference pixel. In consideration of the width of a window that is used to execute the processing of expanding the dot region and the resolution of an image, a pixel at an appropriate position is set as the reference pixel. Only one reference pixel maybe used. But, it is preferred that a plurality of reference pixels are set in the periphery at certain distances from the object pixel in a plurality of directions and that a logical OR of these reference pixels is used. That is, if anyone of the plurality of reference pixels surrounding the object pixel is present in the dot region, the object pixel is, preferably, determined to be also present in the dot region.

The above processings executed by the dot detector 444 result in output of signal S5. If the outputted signal S5 is high, the signal indicates that the object pixel is present in the dot region. Otherwise, the outputted signal S5 becomes low.

Figure 8:
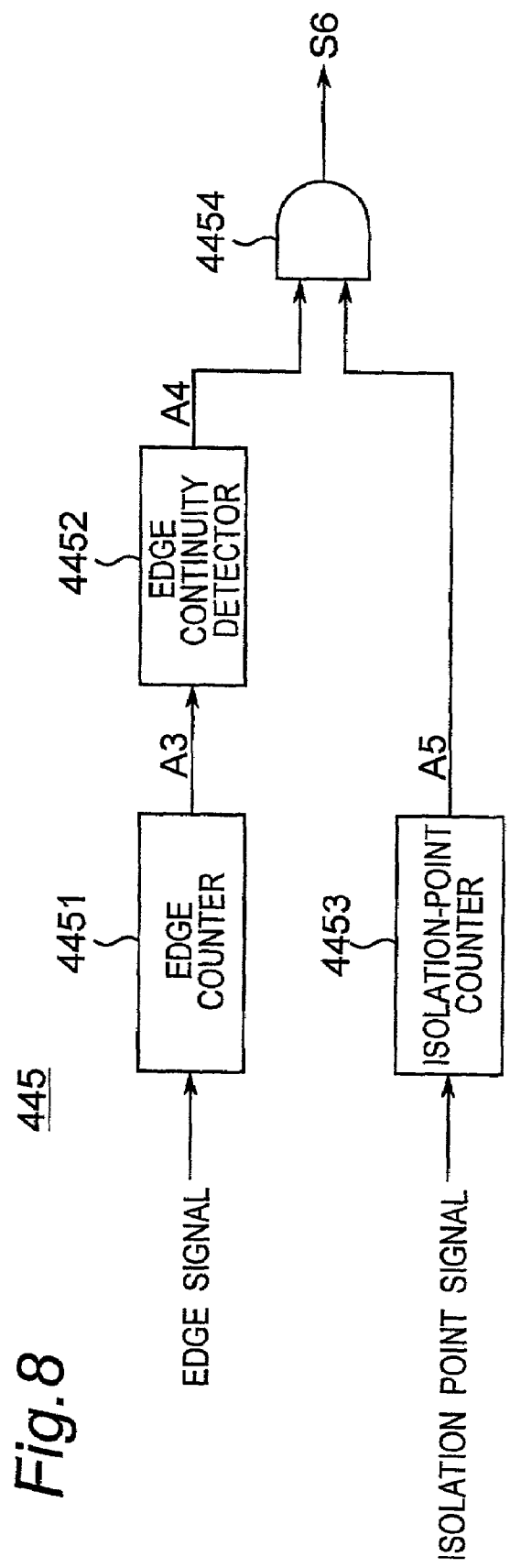
FIG. 8 shows the construction of an in-dot character region detector.

Returning to FIG. 4, based on an edge signal and an isolation point signal, the in-dot character region detector 445 determines whether the object pixel can be predicted as being a pixel in an in-dot character edge region, namely, a character edge region included in a dot region. FIG. 8 shows the construction of the in-dot character region detector 445. The in-dot character region detector 445 has an edge-counter 4451, an edge continuity detector 4452, an isolation-point counter 4453, and an AND circuit 4454.

The edge counter 4451 receives the edge signal and outputs a signal A3. The "edge signal" is a signal generated by a method similar to that of generating the output signal S4 of the isolation-point counter 443 to determine whether the object pixel is present in the character edge region. However, as a threshold for determining whether the object pixel is present in the character edge region, an edge-signal generator (not shown) outputting the edge signal to the in-dot character region detector 445 uses a threshold different from the threshold REF2 used by the character edge detector 443. Consequently an edge signal a little different from the output signal S4 is inputted to the edge counter 4451. More specifically, the threshold used here is made smaller than the threshold REF2 such that even in the case where the degree of change in the lightness is a little low, the object pixel can be detected as a pixel in the character edge region. The reason why the threshold is set to a smaller value is to allow the edge of a character to be detected easily even when the character is included in the dot region in which the edge of the character is present against the ground consisting of dots. Thus, in that case, the amount of the edge is small, compared with the case where the edge of the character is present against a solid ground (white ground).

The edge counter 4451 sets a window, having a predetermined size, in which the object pixel is centered. Based on the inputted edge signal, the edge counter 4451 counts the number of pixels of the character edge region present in the window. A pixel determined as the pixel of the character edge region based on the edge signal is hereinafter referred to as an "edge pixel". If a value obtained as a result of the counting is more than a predetermined threshold REF4, an output signal A3 of the edge counter 4451 becomes high.

When the output signal A3 of the edge counter 4451 is high, the edge continuity detector 4452 determines on the continuity of edge pixels present in the vicinity of the object pixel and outputs a signal A4. The reason why the continuity of edge pixels is determined is as follows. In the in-dot character edge region, there is a high possibility that the edge pixels exist continuously or successively. Thus, if the degree of the continuity is low, it is highly possible that the edge pixel does not correspond to a character edge region even in the case where the number of the edge pixels is higher than the threshold. There is also a possibility that the pixel corresponds to a pixel of the dot region in contact with the character. Preferably, an erroneous determination should be prevented to a highest possible extent.

More specifically, when the object pixel corresponds to an edge pixel, the edge continuity detector 4452 sets a window, having a predetermined size, in which the object pixel is centered, and determines on the continuity of the edge pixel present in the window. If the object pixel satisfies a predetermined requirement of continuity, the edge continuity detector 4452 generates an output signal A4 at a high level. The edge continuity can be determined as follows: Supposing that a window of five pixels by five pixels having the object pixel V33 is set (as described above, V33 corresponds to an edge pixel), it is determined that the object pixel has the edge continuity if the object pixel satisfies any one of the following eight conditions.

That is, the output signal A4 is set high in any one of the following eight cases: (i) pixels V11 and V22 are edge pixels, (ii) V13 and V23 are edge pixels, (iii) V15 and V24 are edge pixels, (iv) V34 and V35 are edge pixels, (v) V44 and V55 are edge pixels, (vi) V43 and V53 are edge pixels, (vii) V42 and V51 are edge pixels, and (viii) V31 and V32 are edge pixels. The determination criteria for the edge continuity are merely an example. Needless to say, it is possible to use other methods.

The isolation-point counter 4453 sets a window, having a predetermined size, in which the object pixel is centered. Based on the isolation point signal, the isolation-point counter 4453 counts the number of isolation points inside the window. If the number of the isolation points is less than a predetermined threshold REF5, an output signal A5 of the isolation-point counter 4453 is high. Although the output signal A1 of the isolation point detector 4442 can be used as the isolation point signal, the isolation point signal can also be generated independently of the signal A1.

The number of the isolation points in the in-dot character region can be counted in a condition (as to the width of a window, threshold, etc.) similar to the counting condition for the isolation-point counter 4443 of the dot detector 444. Alternatively, the condition may be altered. For example, as the threshold REF5, the isolation-point counter 4453 may use a different value from the threshold REF3 used by the isolation-point counter 4443. In addition, the size of the window may be changed. In any case, it is preferable to set a proper condition in consideration of the resolution of the image or the like.

When both the output signals A4 and A5 are high, an output signal S6 of the AND circuit 4454 is high. That is, when the signal S6 is high, this signal indicates that the object pixel may be present in the in-dot character edge region. As will be described later, the signal S6 is inputted to an AND circuit 473 and when an output signal (S10) of the AND circuit 473 is high, it is determined that the object pixel is present in the in-dot character edge region.

Returning again to FIG. 4, based on the output signal S3 of the pixel color signal generator 442, the dot color signal generator 446 sets a window, having a predetermined size, in which the object pixel is centered and counts the number of color pixels inside the window. As a result, the dot color signal generator 446 outputs a signal S7 indicating whether the region in which the object pixel is present is a color region. More specifically, if the counted number of color pixels is more than a predetermined threshold REF6, the output signal S7 is set high. If the counted number of color pixels is not more than the predetermined threshold REF6, the output signal S7 is set low. The output signal S7 at a high level indicates that the object pixel has been determined to be present in a color region.

The input and output of each logic circuit will be described below.

The output signal S4 of the character edge detector 443, an inverted signal of the output signal S5 of the dot detector 444, and an inverted signal of the output signal S6 of the in-dot character region detector 445 are supplied to an AND circuit 471. That is, in the case where the object pixel is present in the edge region of a character present in a region other than the dot region, an output signal S8 of the AND circuit 471 is high.

The output signal S5 of the dot detector 444 and an inverted signal of the output signal S6 of the in-dot character region detector 445 are inputted to an AND circuit 472. Therefore in the case where the object pixel is present in the dot region, an output signal S9 of the AND circuit 472 is high.

The output signal S4 of the character edge detector 443, the output signal S5 of the dot detector 444, and the output signal S6 of the in-dot character region detector 445 are inputted to an AND circuit 473. As described above, the output signal S10 of the AND circuit 473 is high when the object pixel is present in the in-dot character edge region. That is, the character edge detector 443, the dot detector 444, the in-dot character region detector 445, and the AND circuit 473 make a final determination as to whether the object pixel is present in the in-dot character edge region.

The output signal S3 of the pixel-color signal generator 442 and the output signal S8 of the AND circuit 471 are inputted to an AND circuit 474. As described above, the output signal S8 of the AND circuit 471 is high when the object pixel is present in an edge region of a character present in a region other than a dot region. Therefore, an output signal S13 of the AND circuit 474 becomes high when the object pixel is present in an edge region of a color character.

An inverted signal of the output signal S3 of the pixel-color signal generator 442 and the output signal S8 of the AND circuit 471 are inputted to an AND circuit 475. Therefore when the object pixel is present in an edge region of a black character, an output signal S14 of the AND circuit 475 becomes high.

The output signal S7 of the dot color signal generator 446 and the output signal S9 of the AND circuit 472 are inputted to an AND circuit 476. Therefore when the object pixel is present in a color dot region, namely, a region of color dots, an output signal S15 of the AND circuit 476 becomes high.

An inverted signal of the output signal S7 of the dot color signal generator 446 and the output signal S9 of the AND circuit 472 are inputted to an AND circuit 477. Therefore when the object pixel is present in a region of black dots (referred to as a black dot region), an output signal S16 of the AND circuit 477 is high.

The output signal S7 of the dot color signal generator 446 and the output signal S10 of the AND circuit 473 are inputted to an AND circuit 478. Therefore when the object pixel is present in a character edge region in a color dot region, an output signal S11 of the AND circuit 478 is high.

An inverted signal of the output signal S7 of the dot color signal generator 446 and the output signal S10 of the AND circuit 473 are inputted to an AND circuit 479. Therefore when the object pixel is present in a character edge region of a black dot region, an output signal S12 of the AND circuit 479 is high.

As described above, when the object pixel is present in an in-dot character edge region, the output signal S11 of the AND circuit 478 and the output signal S12 of the AND circuit 479 are high. Thus whether the dot region is a color region and whether the character is a color character or a black character are problems to be considered. Thus in the subsequent AND circuits 480–483, with reference to the output of the pixel-color signal generator 442, it is determined whether the object pixel is present in an edge region of a color character or an edge region of a black character.

That is, the output signal S3 of the pixel-color signal generator 442 and the output signal S11 of the AND circuit 478 are inputted to the AND circuit 480. Therefore when the object pixel is determined to be present in a color character edge region of a color dot region, an output signal S17 of the AND circuit 480 becomes high.

An inverted signal of the output signal S3 of the pixel-color signal generator 442 and the output signal S11 of the AND circuit 478 are inputted to the AND circuit 481. Therefore when the object pixel is present in a black character edge region included in a color dot region, an output signal S18 of the AND circuit 481 becomes high.

The output signal S3 of the pixel-color signal generator 442 and the output signal S12 of the AND circuit 479 are inputted to the AND circuit 482. Therefore when the object pixel is present in a color character edge region included in a black dot region, an output signal S19 of the AND circuit 482 becomes high.

An inverted signal of the output signal S3 of the pixel-color signal generator 442 and the output signal S12 of the AND circuit 479 are inputted to the AND circuit 483. Therefore when the object pixel is present in a black character edge region included in a black dot region, an output signal S20 of the AND circuit 483 becomes high.

The region determination signals S13–S20 generated as described above are inputted to the image corrector 451 which performs image processing based on the inputted signals, as will be described later. All of the signals S13–S20 maybe low, depending on the kind of an image. In this case, image processing for correction should not be executed.

(4) Content of Processing of Image Corrector 451

The content of processing which is executed by the image corrector 451 will be described below. The image corrector 451 serves as a dot region smoother. When the object pixel is a pixel present in an in-dot character edge region, the image corrector 451 determines whether the object pixel is a color pixel and whether the dot region is a color region, and switches the content of image processing based on the determination results.

Figure 9:
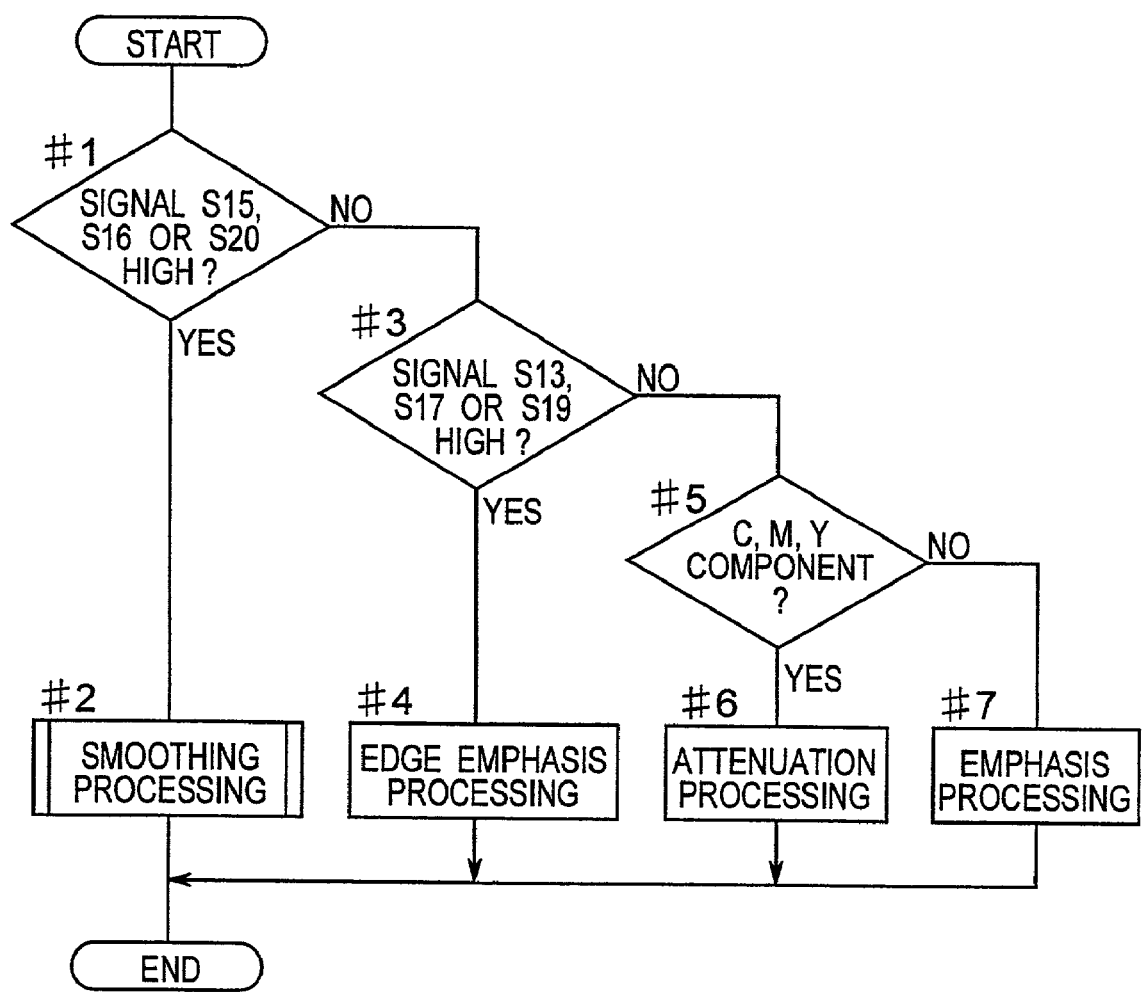
FIG. 9 is a flowchart showing an operation of an image corrector to change the image processing contents based on results of region determination by the region determiner.

More specifically, referring now to FIG. 9, the image corrector 451 determines whether the region determination signals S15, S16, and S20 are high (#1). If any one of the region determination signals S15, S16, and S20 is high, the image corrector 451 executes smoothing processing (#2). If all of the region determination signals S15, S16, and S20 are low (NO at #1), then it is determined whether the region determination signals S13, S17, and S19 are high (#3). If any one of the region determination signals S13, S17, and S19 is high, then the image corrector 451 executes edge emphasis processing (#4). If all of the region determination signals S13, S17, and S19 are low (NO #3), and if the object pixel is of a C, M, or Y component (#5), then the image corrector 451 executes attenuation processing for the C, M or Y component (#6). On the other hand, if the object pixel is of a K component (#5), the image corrector 451 executes K-component emphasis processing (#7).

Table 1 below shows the content of the image processing that is executed depending on the result of a determination made as to whether the character edge region consists of color pixels and whether the dot region is a color region.

TABLE 1

| Result of region determination (determination signal) | | Image processing | |
|---|---|---|---|
| | | C, M, Y components | K component |
| Color character edge | S13 | Edge emphasis | Edge emphasis |
| Black character edge | S14 | Attenuation | Emphasis |
| Color dot | S15 | Smoothing | Smoothing |

TABLE 1-continued

| Result of region determination (determination signal) | | Image processing | |
|---|---|---|---|
| | | C, M, Y components | K component |
| Black dot | S16 | Smoothing | Smoothing |
| Color character edge in color dot | S17 | Edge emphasis | Edge emphasis |
| Black character edge in color dot | S18 | Attenuation | Emphasis |
| Color character edge in black dot | S19 | Edge emphasis | Edge emphasis |
| Black character edge in black dot | S20 | Smoothing | Smoothing |

As shown in table 1, when the object pixel is present in a black character edge region included in a black dot region (namely, when the region determination signal S20 is high), the image corrector 451 does not execute edge emphasis processing for the edge of the black character which consists of the K component emphasis processing and the C, M, or Y component attenuation processing. Thus, even if it is erroneously determined that a black pixel, which is actually present in a dot region in contact with a black character present in a black dot region, is present in a black character edge region included in the black dot region, it is possible to prevent the black character edge emphasis processing from being executed on that pixel present in the dot region. As a result, it is possible to restrain deterioration of the image quality.

Although the smoothing processing is executed for the pixel determined as being present in a black character edge region included in a black dot region in the example shown in table 1, it is possible to execute normal edge emphasis processing not accompanied with the attenuation processing of the C, M, or Y component or the emphasis processing of the K component. It is also possible not to execute any image processing.

(5) Smoothing Processing

Of the correction processings which are executed by the image corrector 451, the smoothing processing will be described in detail below. Because the edge emphasis processing, the attenuation processing of the C, M, and Y components, and the emphasis processing of the K component are well known, detailed description thereof is omitted herein.

The smoothing processing of the embodiment is characterized in control executed based on a tone difference detection signal fij outputted from the tone detector 4401 included in the region determiner 440.

Figure 13:
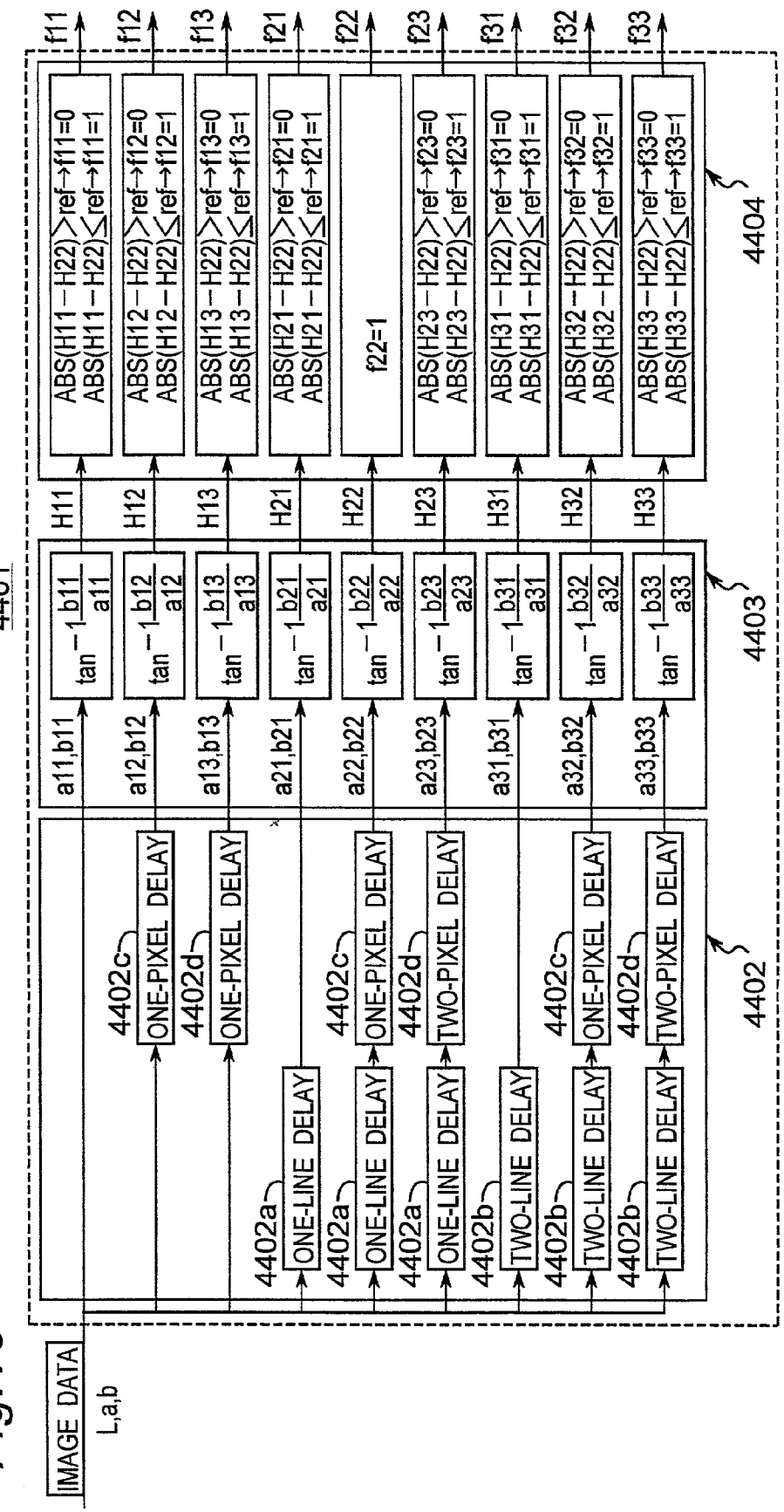
FIG. 13 shows the construction of a tone detector included in the region determiner.

FIG. 13 is a block diagram showing the construction of the tone detector 4401. The tone detector 4401 has a window-setting portion 4402 setting a window on image data of the uniform color space Lab, a tone detection processing portion 4403 serving as a tone detection means, and a tone comparison processing portion 4404 serving as a tone difference detection means. The window-setting portion 4402 sets a window of three pixels by three pixels on the image data of the uniform color space Lab by combining no line delays, one-line delays 4402a, and two-line delays 4402b with no pixel delays, one-pixel delays 4402c, and two-pixel delays 4402d. Each pixel inside the window is identified by the row number i and the column number j (i, j=1, 2, 3). The tone detection processing portion 4403 performs a computation of Expression (5) shown below by using image data of each pixel inside the window to detect a tone Hij of each pixel inside the window.

$$\tan^{-1}\frac{bij}{aij} \quad (i, j = 1, 2, 3) \tag{5}$$

Using the tone data Hij of each pixel outputted from the tone detection processing portion 4403, the tone comparison processing portion 4404 performs a computation of Expression (6) shown below to determine whether a difference in tone between a target pixel (i=2 and j=2) inside the window and peripheral pixels around the target pixel in the window is more than a predetermined reference value, ref, and outputs the tone difference detection signal fij indicating the result of the detection.

$$\begin{cases} ABS(Hij - H22) > ref \rightarrow fij = 0 \\ ABS(Hij - H22) \leq ref \rightarrow fij = 1 \end{cases} \tag{6}$$

where ABS (Hij–H22) indicates the absolute value of the difference between Hij and H22. According to Expression (6), if ABS (Hij–H22) is more than the reference value, ref, the detection result fij (i, j=1, 3) will be zero for the peripheral pixels. On the other hand, if ABS (Hij–H22) is equal to or less than the reference value, ref, then the detection result fij for the peripheral pixels will be one. As is obvious, the detection result f22 of the target pixel is always one.

FIG. 10 shows the flow of the smoothing processing.

Initially the tone detector 4401 sets the window (smoothing filter) of three pixels by three pixels on the image data and detects the tone H22 of a target pixel (i=2 and j=2) (#11). Thereafter the tone detector 4401 detects the tone Hij of a certain peripheral pixel present in the periphery of the target pixel inside the window (#12). The tone comparison processing portion 4404 compares the difference in tone ABS (Hij–H22) between the target pixel and the peripheral pixel with the predetermined reference value, ref (#13). If the tone difference ABS (Hij–H22) is equal to or less than the reference value ref, i.e., if fij=1 (YES at #14), the peripheral pixel is set as an object pixel contributing to the smoothing processing for the target pixel (#15). On the other hand, if the tone difference ABS (Hij–H22) is more than the reference value ref, i.e., if fij=0 (NO at #14), the peripheral pixel is excluded from the object pixel contributing to the smoothing processing for the target pixel (#16). The processing at #12–190 16 is repeated for all peripheral pixels inside the window (#17). Thereafter, a total number of object pixels contributing to the smoothing processing is computed (#18). The total number is used as a denominator (divisor) in computing an average value in the subsequent smoothing processing. An average value of the image data of the target pixel and of the object pixels contributing to the smoothing processing is computed. The image data of the target pixel is replaced with the computed average value to execute the smoothing processing (#19).

Because the peripheral pixel having a big difference in its tone from that of the target pixel is excluded from the object pixel contributing to the smoothing processing, the tone is restrained from being changed by the smoothing processing.

For example, suppose that a window having a size of three pixels by three pixels is set as shown in FIG. 11B in a dot region (input image data), as shown in FIG. 11A, including red dots dr and black dots dk. Also suppose that gradation data (decided by colors of dots and color of the ground) as read are as shown in FIG. 11C. To simplify the description, R, G, and B are used as image data.

In the conventional art shown in FIGS. 12A–12C, all peripheral pixels of the input data contained in the window are set as object pixels, and the smoothing processing of replacing the lightness data R, G, and B of the target pixel with the average value of all the pixels inside the window is executed. In this case, as shown in FIG. 12C, the tone (R component) of the target pixel changes. Actually the target pixel in FIG. 12C is unbalanced in the RGB and its tone has changed from red toward magenta.

On the other hand, in the embodiment, as shown in FIGS. 12D and 12E, peripheral pixels (in the example, a pixel at i=2, j=1 and a pixel at i=3 and j=1) that have a big difference in tone from the target pixel are excluded from the object pixel, and the smoothing processing of replacing the lightness data R, G, and B of the target pixel with the corresponding average values of the remaining seven pixels is executed. In this case, as sown in FIG. 12F, the smoothing processing is capable of restraining a change of the tone. Actually the RGB balance of the target pixel shown in FIG. 12F is maintained, with data R (red) maintained at 255. Since the peripheral pixel having a big difference in its tone from that the target pixel is excluded from the object pixel contributing to the smoothing processing, it was possible to prevent the tone from being changed by the smoothing processing.

In the embodiment, since the smoothing processing is executed for the dot region, it is possible to prevent Moire from being generated in the dot region.

FIG. 14 is a block diagram of the smoother 4511 included in the image corrector 451. The smoother 4511 is characterized in that to execute the smoothing processing in a generalized form, the smoother 4511 uses the tone difference detection signal fij outputted from the tone detector 4401 as a filter coefficient.

The smoother 4511 has smoothing circuits 4511C, 4511M, 4511Y, and 4511K, having the same construction, provided for the colors C, M, Y, and K respectively. For example, the smoothing circuit 4511C for C (cyan) has a window-setting portion 4512 for setting a window on the image data of C, M, Y, and K, a smoothing computing portion 4513, and devisor computation portion 4514. The window-setting portion 4512 sets a window of three pixels by three pixels on the image data of C (cyan) by combining no line delays, one-line delays 4512a, two-line delays 4512b with no pixel delays, one-pixel delays 4512c, and two-pixel delays 4512d. The window-setting portion 4512 outputs density data C11–C33 of each pixel inside the window. The smoothing computing portion 4513 performs a computation of Expression (7) shown below by using the density data C11–C33:

$$C = C11 * f11 + C12 + f12 + C13 * f13 + C21 * f21 + C22 + \tag{7}$$
$$f22 + C23 * f23 + C31 * f31 + C32 + f32 + C33 * f33$$

In the computation of Expression (7), because density data Cij of peripheral pixels having the detection result of fij=1 contribute to the result of the computation, those peripheral pixels are equivalently included in the object pixels contributing to the smoothing processing of the target pixel. On the other hand, peripheral pixels having the detection result of fij=0 are equivalently excluded from the object pixels contributing to the smoothing processing of the target pixel because the density data Cij of such peripheral pixels do not contribute to the result of the computation.

Suppose an output C of the smoothing computing portion 4513 is divided by nine, which is the total number of pixels inside the window, to obtain a result (average value) of the smoothing processing. In this case, if any equivalently excluded peripheral pixels (two in the embodiment) are present in the window, the result of the division will be small, as shown in FIGS. 16A–16C.

To avoid such a problem, the devisor computation portion 4514 shown in FIG. 14 performs a computation of Expression (8) shown below for an output C of the smoothing computing portion 4513 and finds a result (average value) C'. If there are equivalently-excluded peripheral pixels (two in the embodiment) in the window, the computation of Expression (8) is equivalent to a division of the output C by the number of the object pixels (7 in this example) contributing to the smoothing processing of the target pixel, as shown in FIGS. 15A–15C. Accordingly a proper average value C' is obtained as the result of the smoothing computation.

$$C' = \frac{C}{f11 + f12 + f13 + f21 + f22 + f23 + f31 + f32 + f33} \quad (8)$$

In the present embodiment, the tone detector 4401 is arranged to set the filter coefficient fij to one when the tone difference ABS (Hij−H22) between the target pixel and a peripheral pixel is equal to or less than the reference value, ref, while setting the filter coefficient fij to zero when the tone difference ABS (Hij−H22) is more than the reference value, ref. Therefore the filter coefficient fij takes only zero and one. However the filter coefficient fij can be changed to a desired value according to the difference in tone between the target pixel and a peripheral pixel around the target pixel, as shown in FIGS. 17A–17C.

FIG. 19 is a block diagram showing the construction of a smoother 4511' that changes the filter coefficient according to the difference in tone between the target pixel and the peripheral pixel.

The smoother 4511' has smoothing circuits 4511C', 4511M', 4511Y', and 4511K', having the same construction, provided for the colors C, M, Y, and K respectively. The smoothing circuit 4511C' for C (cyan), for example, has a window-setting portion 4512 for setting a window on the image data of C, M, Y, and K, a filter coefficient switching/computing portion 4515, and a smoothing computing portion 4516. The window-setting portion 4512, which has the same construction as that shown in FIG. 14, sets a window of three pixels by three pixels on the image data of C (cyan) and outputs density data C11–C33 of each pixel inside the window. Supposing that a is an arbitrary value set by a user and k is a value obtained by Expression (9) below, the filter coefficient switching/computing portion 4515 performs a computation shown by Expression (10) below.

$$k = \frac{9 - (\overline{f11} * a + \overline{f12} * a + \overline{f13} * a + \overline{f21} * a + \overline{f22} * a + \overline{f23} * a + \overline{f31} * a + \overline{f32} * a + \overline{f33} * a)}{f11 + f12 + f13 + f21 + f22 + f23 + f31 + f32 + f33} \quad (9)$$

-continued
$$\begin{cases} fij = 1 \rightarrow Cij = Cij * k \\ fij = 0 \rightarrow Cij = Cij * a \end{cases} \quad (10)$$

As shown above, when fij=1, Cij=Cij*k; when fij=0, Cij=Cij*a That is, the filter coefficient switching/computing portion 4515 multiplies each density data Cij by the filter coefficient k or a, according as fij=1 or fij=0.

Using the density data Cij (a value after multiplied by a filter coefficient) outputted from the filter coefficient switching/computing portion 4515, the smoothing/computing portion 4516 computes an average value of the density data Cij of all object pixels inside the window by using Expression (11) and replaces the image data of the target pixel with the found average value to execute the smoothing processing.

$$C22 = \frac{C11 + C12 + C13 + C21 + C22 + C23 + C31 + C32 + C33}{9} \quad (11)$$

Expression (11) is the same as that used in a conventional smoothing processing.

Figure 18:
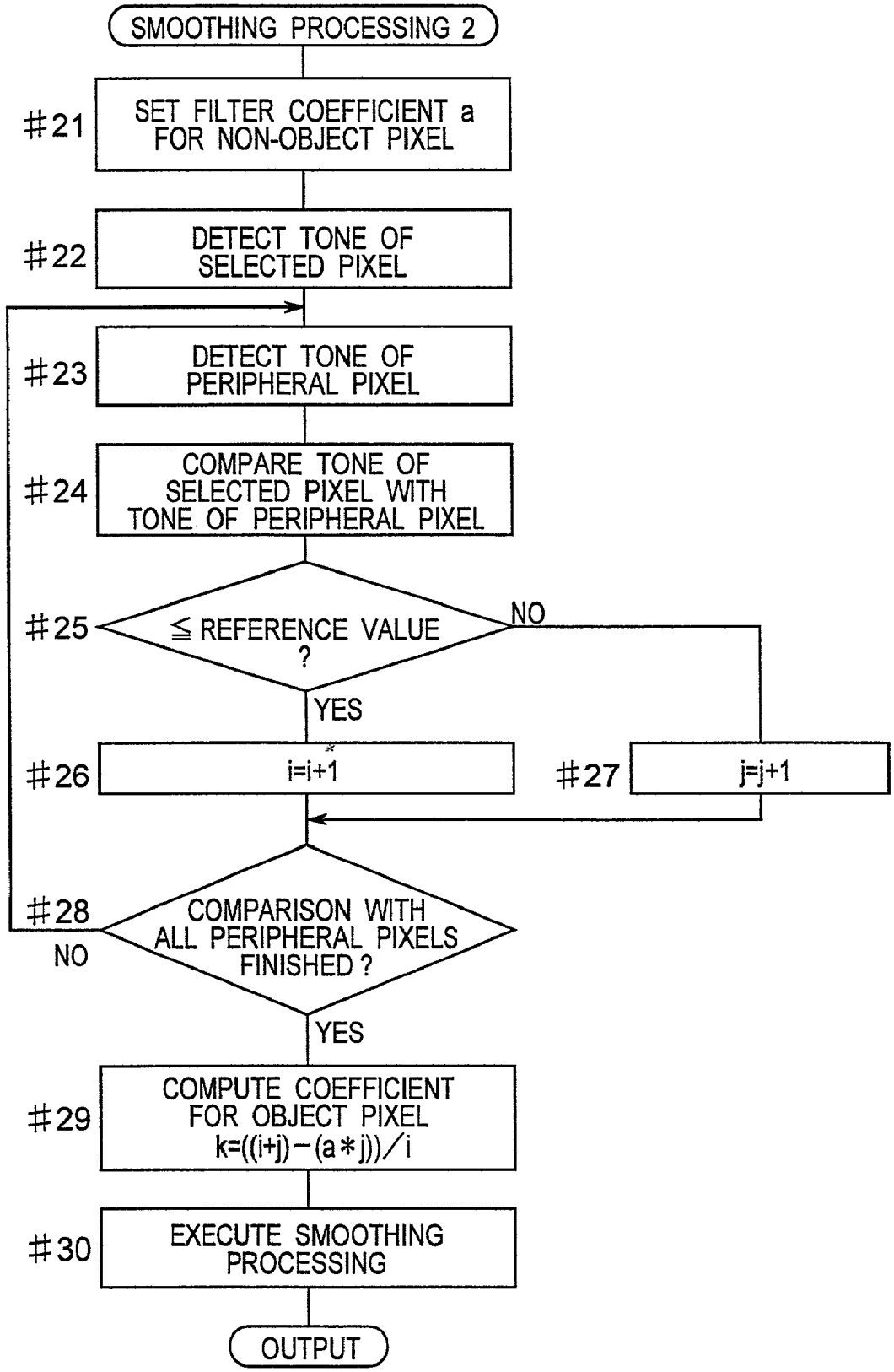
FIG. 18 is a flowchart showing another smoothing processing executed in the embodiment of the present invention.

FIG. 18 shows the procedure of the smoothing processing (smoothing processing 2) that is executed by the smoother 4511').

Initially, through the operation panel, a user sets a filter coefficient f or a peripheral pixel having a tone different from the tone of the target pixel by more than the reference value, ref, namely, a filter coefficient for non-object pixels) (#21).

Thereafter the window-setting portion 4402 of the tone detector 4401 sets a window of three pixels by three pixels on the image data. Thereafter, the tone detection processing portion 4403 detects the tone H22 of the target pixel (i=2 and j=2) inside the window (#22) Thereafter the window-setting portion 4402 detects the tone Hij of a certain peripheral pixel present around the target pixel inside the window (#23). The tone comparison processing portion 4404 compares the tone difference ABS (Hij−H22) between the target pixel and the peripheral pixel with the reference value, ref (#24). If the difference ABS (Hij−H22) is equal to or less than the reference value ref, i.e., if fij=1 (YES at #25), i is incremented by one (#26). On the other hand, if the difference ABS (Hij−H22) is more than the reference value ref, i.e., if fij=0 (NO at #25), j is incremented by one (#27). After the processing at #23–#27 is repeated for all peripheral pixels inside the window (#28), a filter coefficient k for peripheral pixels having a tone which is different from the tone of the target pixel by the reference value, ref, or less, that is, a filter coefficient for object pixels is computed (#29). The smoother 4511' executes smoothing processing (#30). Specifically, after the window-setting portion 4512 sets the window of three pixels by three pixels on the image data, the filter coefficient switching/computing portion 4515 multiplies each density data Cij by the filter coefficient k or a, according as fij=1 or fij=0. Using the density data Cij (a value after multiplied by the filter coefficient) outputted from the filter coefficient switching/computing portion 4515, the smoothing/computing portion 4516 computes an average value of the density data Cij of all pixels inside the window by using Expression (11) and replaces the image data of the target pixel with the found average value.

Owing to appropriate switching of the filter coefficient, it is possible to effectively restrain the target pixel from being changed in its tone by the smoothing processing. In the example shown in FIGS. 17A–17C, the value of the coefficient k for the peripheral pixels is 1.28. In this case, it is possible to effectively restrain the density level (or lightness level) of the target pixel from being affected by the smoothing processing.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processing apparatus comprising:
   smoothing means for executing smoothing processing upon image data of a target pixel;
   tone detection means for detecting a tone of the target pixel and tones of peripheral pixels around the target pixel;
   tone difference detection means for detecting a tone difference between the target pixel and each peripheral pixel; and
   control means for controlling the smoothing means, based on the tone differences between the target pixel and the peripheral pixels, such that a change of the tone of the target pixel is suppressed.

2. The image processing apparatus according to claim 1, further comprising:
   region detection means for determining whether the target pixel is present in a dot region,
   wherein when the region detection means determines that the target pixel is present in the dot region, the smoothing means executes smoothing processing for the target pixel.

3. The image processing apparatus according to claim 1, wherein the control means excludes a peripheral pixel having a tone difference larger than a predetermined value from the target pixel, from an object pixel contributing to the smoothing processing of the target pixel.

4. The image processing apparatus according to claim 1, wherein the control means switches a filter coefficient for smoothing processing of the target pixel when a peripheral pixel having a tone difference larger than a predetermined value from the target pixel is present in a predetermined region around the target pixel.

5. The image processing apparatus according to claim 1, wherein the smoothing means replaces the image data of the target pixel with an average value of the image data of the target pixel and image data of the peripheral pixels.

6. The image processing apparatus according to claim 5, wherein the smoothing means replaces the image data of the target pixel with a weighted average value of the image data of the target pixel and the image data of the peripheral pixels.

7. The image processing apparatus according to claim 6, wherein the control means sets a weight to zero for a peripheral pixel having a tone difference larger than a reference value from the target pixel.

8. The image processing apparatus according to claim 6, wherein the control means changes a weight for a peripheral pixel, according to the tone difference of the peripheral pixel from the target pixel.

9. The image processing apparatus according to claim 5, wherein the smoothing means replaces the image data of the target pixel with an average value of image data of the target pixel and image data of peripheral pixels having a tone difference from the target pixel that is smaller than a reference value.

10. An image processing method comprising:
    detecting a tone of a target pixel and tones of peripheral pixels around the target pixel;
    detecting a tone difference between the target pixel and each peripheral pixel; and
    executing smoothing processing upon image data of the target pixel, based on the tone differences between the target pixel and the peripheral pixels, in such a way as to suppress a change of the tone of the target pixel.

11. The image processing method according to claim 10, further comprising:
    determining whether the target pixel is present in a dot region,
    wherein when it is determined that the target pixel is present in the dot region, smoothing processing for the target pixel is performed.

12. The image processing method according to claim 10, wherein a peripheral pixel having a tone difference larger than a predetermined value from the target pixel is excluded from an object pixel contributing to the smoothing processing of the target pixel.

13. The image processing method according to claim 10, wherein a filter coefficient used for the smoothing processing of the target pixel is switched when a peripheral pixel having a tone difference larger than a predetermined value from the target pixel is present in a predetermined region around the target pixel.

14. A computer program product comprising:
    a computer-readable medium; and
    a computer program recorded on the computer-readable medium for performing the steps of:
    detecting a tone of a target pixel and tones of peripheral pixels around the target pixel;
    detecting a tone difference between the target pixel and each peripheral pixel; and
    executing smoothing processing upon image data of the target pixel, based on the tone differences between the target pixel and the peripheral pixels, in such a way as to suppress a change of the tone of the target pixel.

* * * * *

UNITED STATES PATENT AND TRADEMARK OFFICE
CERTIFICATE OF CORRECTION

PATENT NO. : 7,170,635 B2  Page 1 of 1
APPLICATION NO. : 10/153496
DATED : January 30, 2007
INVENTOR(S) : Kazuhiro Ishiguro It is certified that error appears in the above-identified patent and that said Letters Patent is hereby corrected as shown below:

Column 11, Line 55: add a space between the words "may" and "be" [should read: Only one reference pixel may be used.]

Column 17, Line 51: delete "190" and add --#-- [should read: #12-#16 is repeated . . .]

Signed and Sealed this

Twelfth Day of June, 2007

JON W. DUDAS
*Director of the United States Patent and Trademark Office*